Aug. 16, 1966  I. CAPLAN  3,266,120
MACHINE FOR MAKING UMBRELLA TUBES
Filed Aug. 12, 1963  19 Sheets-Sheet 1

Aug. 16, 1966     I. CAPLAN     3,266,120
MACHINE FOR MAKING UMBRELLA TUBES
Filed Aug. 12, 1963     19 Sheets-Sheet 2

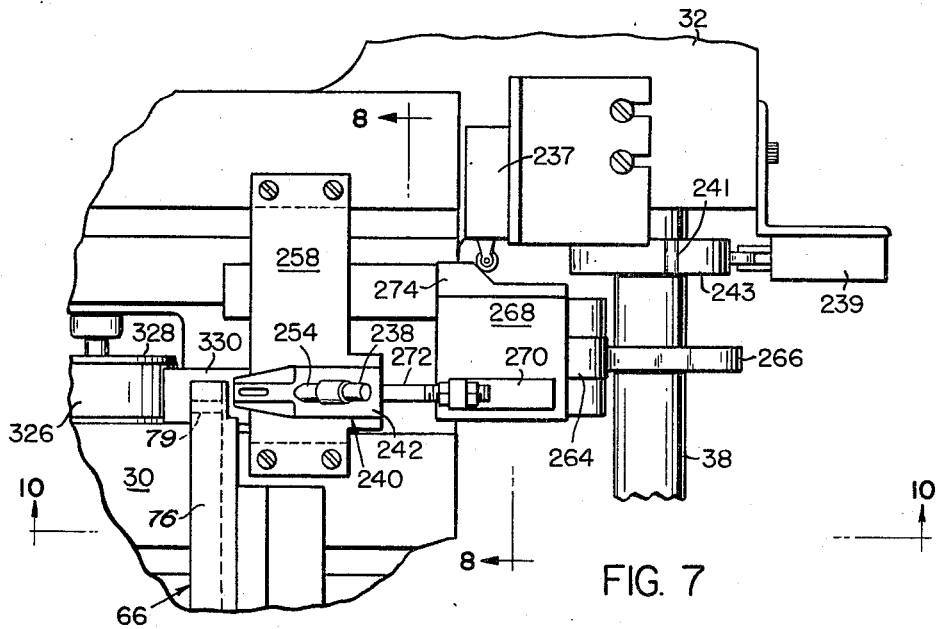
FIG. 7
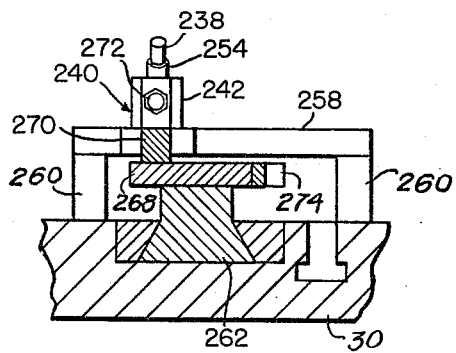
FIG. 8
FIG. 10

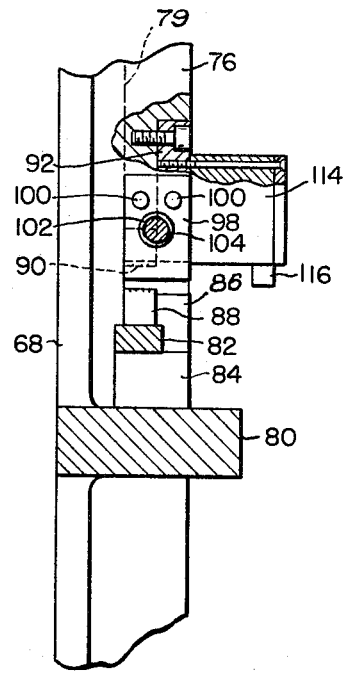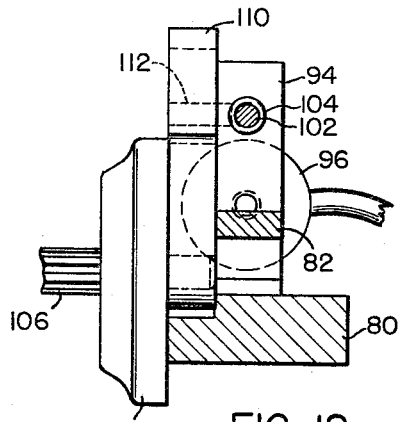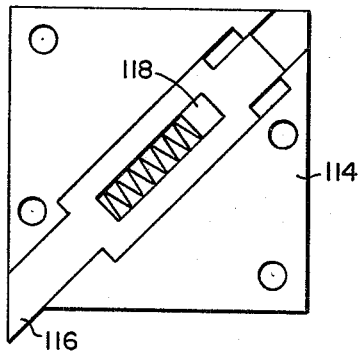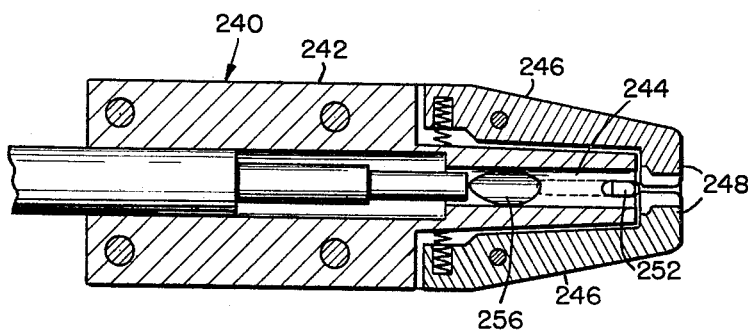

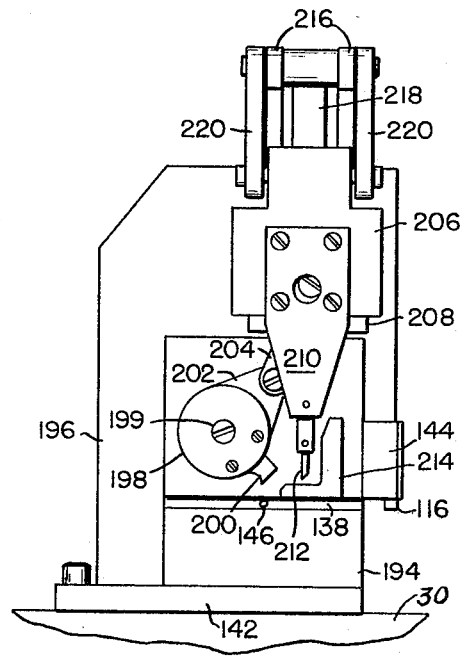
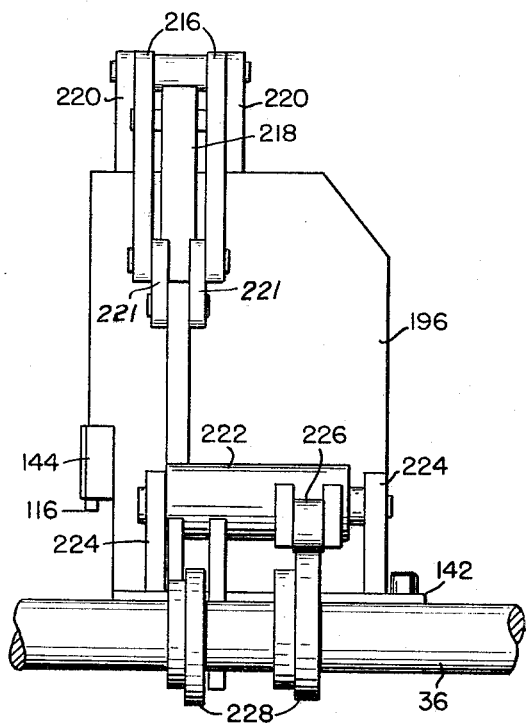
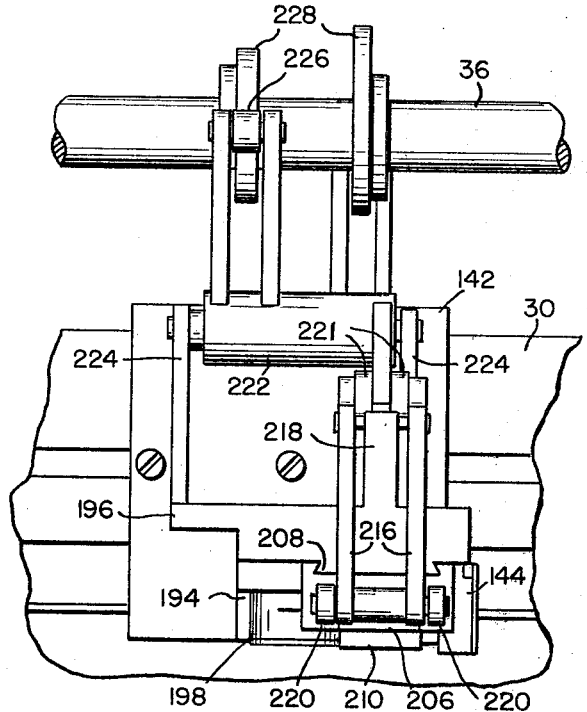
FIG. 15
FIG. 17
FIG. 16

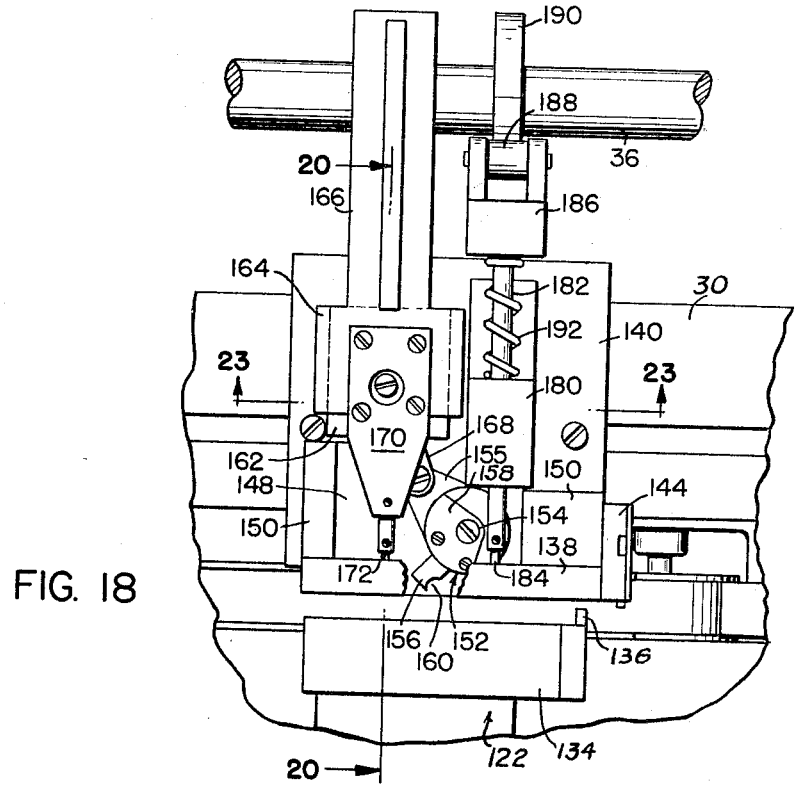
FIG. 18
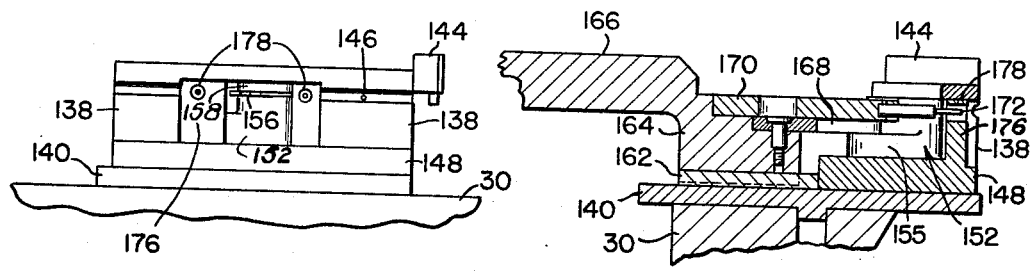
FIG. 19
FIG. 20

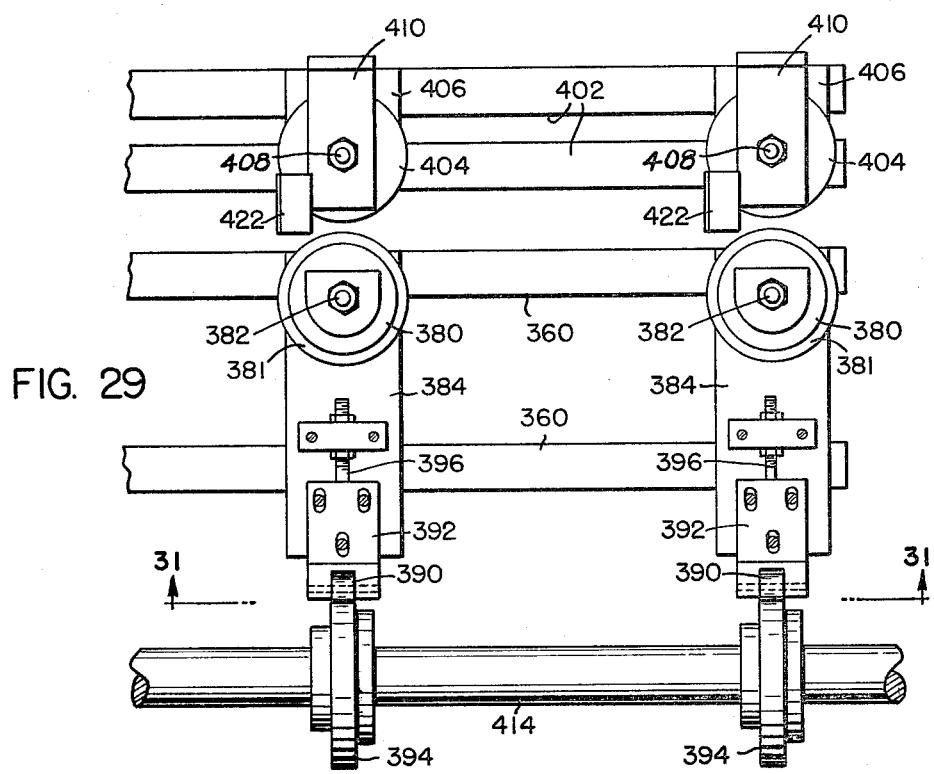
FIG. 29
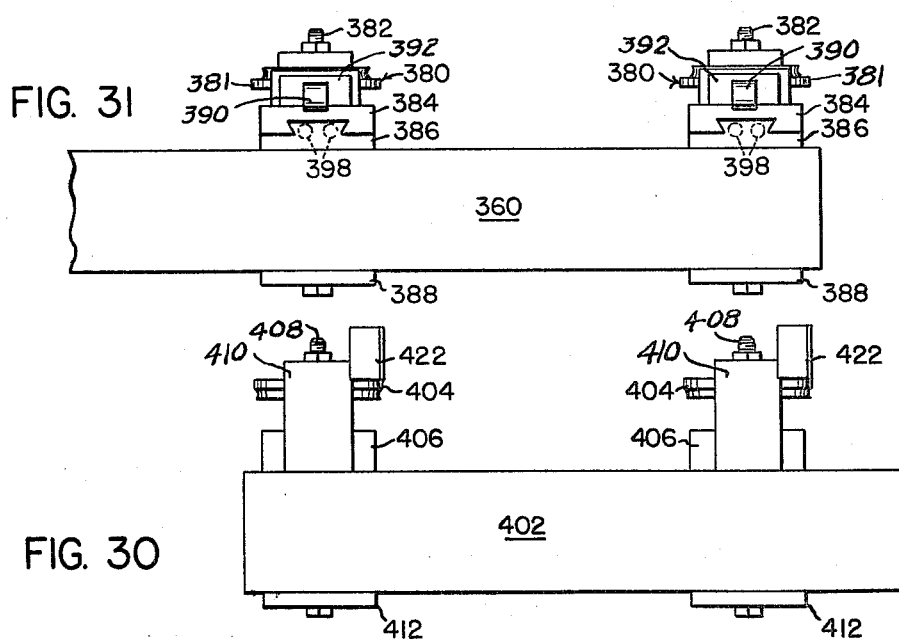
FIG. 31
FIG. 30

Aug. 16, 1966  I. CAPLAN  3,266,120
MACHINE FOR MAKING UMBRELLA TUBES
Filed Aug. 12, 1963  19 Sheets-Sheet 18

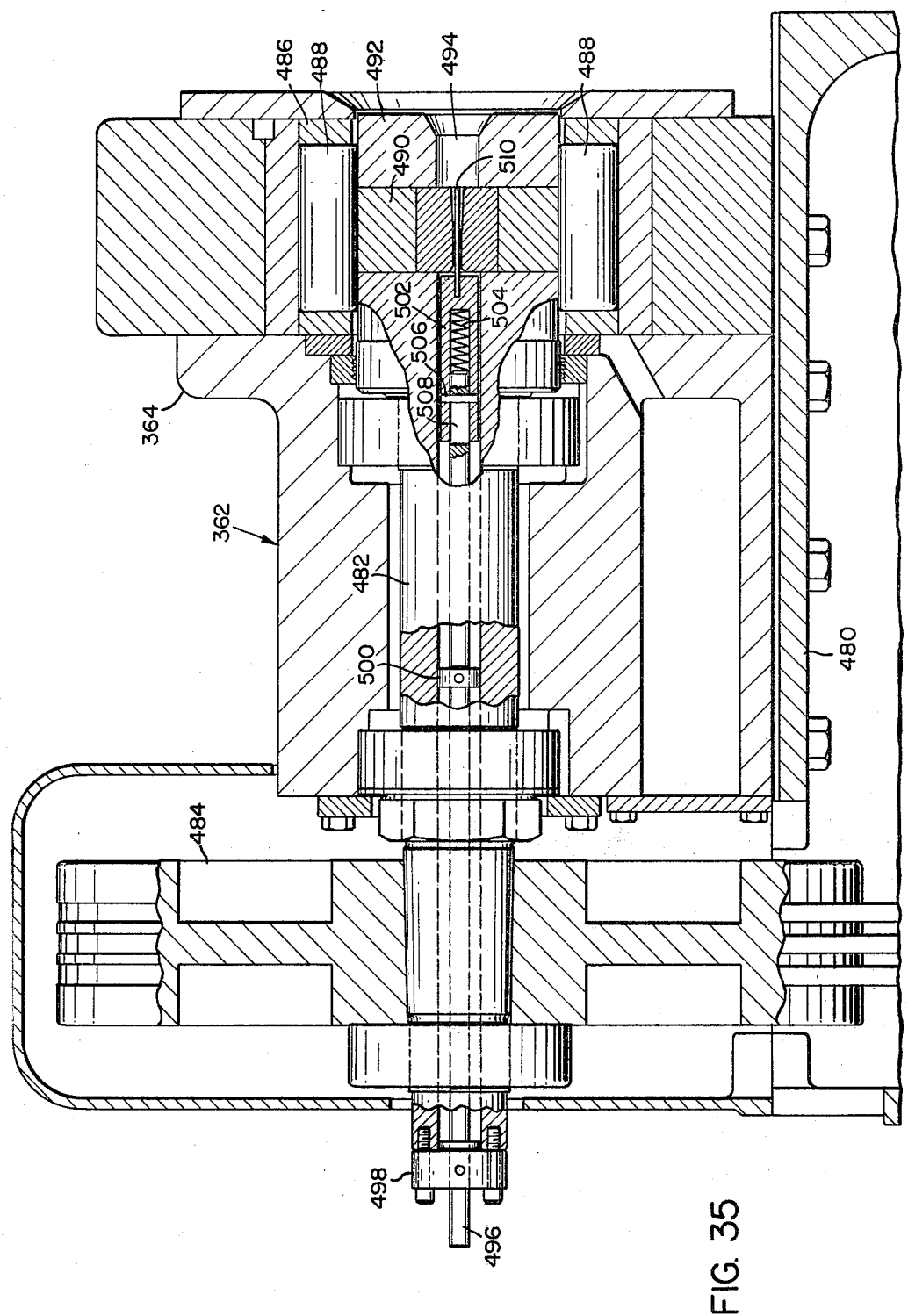

United States Patent Office 3,266,120
Patented August 16, 1966

3,266,120
MACHINE FOR MAKING UMBRELLA TUBES
Isadore Caplan, Brighton, N.Y., assignor of one-half to Markin Tubing, Inc., Rochester, N.Y., a corporation of New York
Filed Aug. 12, 1963, Ser. No. 301,460
18 Claims. (Cl. 29—25)

The present invention relates to a method and machine for automatically making umbrella tubes.

An object of the invention is to provide a machine for making umbrella tubes automatically.

Another object of the invention is to provide a machine having a hopper for receiving a plurality of tubes with means for feeding the tubes one at a time into an operating position where the tube is formed with two sets of latch receiving slots, has a tip applied in one end, then has the tube conveyed to a swaging device for swaging the end of the tube around the rivet to tightly fit the rivet and provide a tapered end on the tube.

A further object of the invention is to provide a machine for automatically making umbrella tubes having a hopper in which a supply of tubes are delivered for movement through the machine one at a time with mechanism for feeding and knurling one end of each tube in the hopper in delivering the tube to an operating position where a clamping means holds the tube while suitable forming means forms two sets of latch receiving slots in predetermined relation in the tube, tip feeding means inserts a tip in the end of the tube opposite to the knurled end while crimping means crimps the knurled terminal portion of the tube, conveyor means conveys the tube after discharge from the operating position to a swaging device which forms a taper on the end of the tube carrying the tip to rigidly secure the tip in the tube, and the tubes are discharged from the machine and prepared to receive the remaining portions of an umbrella construction.

Another object of the invention is to provide a machine for automatically making umbrella tubes by placing a supply of tubes to be formed in a hopper, feeding the tubes one at a time through a knurling device for knurling one end of each tube, then delivering the tube to a holding device for clamping the tube in an operating position where the tube is formed with two sets of latch receiving slots, a stop for limiting movement of a runner toward one terminal portion of the tube, insertion of a tip in the end of the tube adjacent the stop and the crimping of the opposite end of the tube, subsequently conveying the formed tube to a swaging device for forming a tapered end on the tube about the tip for finishing the tip and the end of the tube and rigidly retaining the tip on the tube and discharging the finished tube from the machine.

Another object of the invention is to provide a machine having means for automatically forming a mark on an umbrella tube at a predetermined distance from the knurled end of the tube to indicate the position for locating the end of the umbrella handle when it is engaged over the tube.

A further object of the invention is to provide a method for making umbrella tubes by forming a dimple in the terminal portions of a tube, feeding the tube through a knurling station to knurl one end of the tube, continuing the feed of the tube into an operating position, forming a plurality of umbrella latch receiving slots in a tube in the operating position, forming a tube with a stop projection, a handle positioning mark and inserting a tip in the other end of the tube in the operating position, conveying the tube from the operating position into a swaging position for swaging the end of the tube about the tip, and removing the tube from the swaging position.

There and other desirable objects may be attained in the manner disclosed as an illustrative embodiment of the invention in the following description and in the accompanying drawings forming a part hereof, in which:

FIG. 7 is a plan view of the rivet holder assembly on an enlarged scale to show details of construction;

FIG. 8 is a vertical cross-section taken approximately on line 8—8 of FIG. 7;

FIG. 9 is a horizontal cross-section taken approximately on line 9—9 of FIG. 6;

FIG. 10 is a fragmentary vertical cross-section taken substantially on the line 10—10 of FIG. 7 showing the rivet holder assembly in front elevation;

FIG. 12 is a cross-section through the knurling assembly taken approximately on line 12—12 of FIG. 11;

FIG. 13 is another cross-section through the knurling assembly taken approximately on line 13—13 of FIG. 11;

FIG. 14 is an enlarged detail side elevation of one of the spring pressed latch casings with the cover removed showing the details of construction;

FIG. 15 is a front elevation of the vertical punch and slotting assembly on an enlarged scale;

FIG. 16 is a plan view of the vertical punch and slotting assembly on the enlarged scale as shown in FIG. 15;

FIG. 17 is a rear elevation of the vertical punch and slotting assembly as shown in FIG. 15;

FIG. 18 is a plan view on an enlarged scale of the horizontal punch and slotting assembly;

FIG. 19 is a front elevation of the horizontal punch and slotting assembly as shown in FIG. 18;

FIG. 20 is a vertical cross-section taken approximately on line 20—20 of FIG. 18;

FIG. 27 is an enlarged cross-section showing the crimper die construction taken approximately on line 27—27 of FIG. 26;

FIG. 29 is an enlarged plan view of the swager feed rolls;

FIG. 30 is a rear elevation of the swager feed rolls;

FIG. 31 is a vertical cross-section of the swager feed roll assembly taken approximately on line 31—31 of FIG. 29;

FIG. 35 is an enlarged fragmentary rear elevation of the swager with portions broken away and shown in cross-section to illustrate details of construction.

The present invention provides a machine for forming predetermined lengths of tubing of a desired size or sizes into a completed umbrella tube ready for the assembly of the remaining umbrella parts thereon. The umbrella tube referred to herein is the central post, column or shaft of the umbrella. This central post or shaft mounts the ribs that carry the cover, the runner and the handle. The struts are pivotally connected to the runner at one end and to the intermediate portions of the ribs at the other end. The invention deals with the manufacture of the central post or shaft from metallic tubing cut in predetermined lengths so that a plurality of tubes of fixed length and size or diameter may be automatically fed through the machine and formed into completed umbrella tubes.

Figure 2:
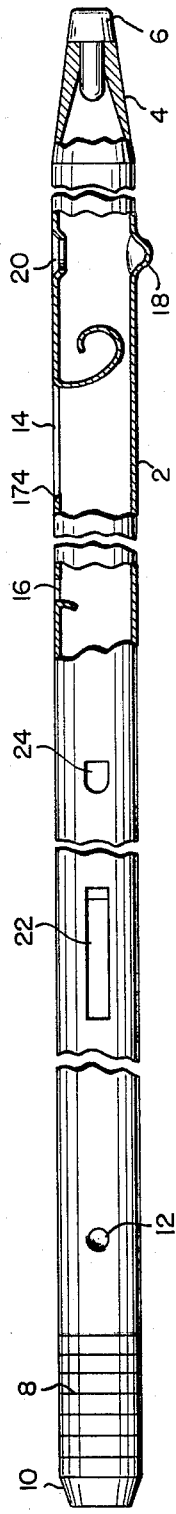
FIG. 2 is a rear elevation of the umbrella rod shown in FIG. 1.
Figure 1:
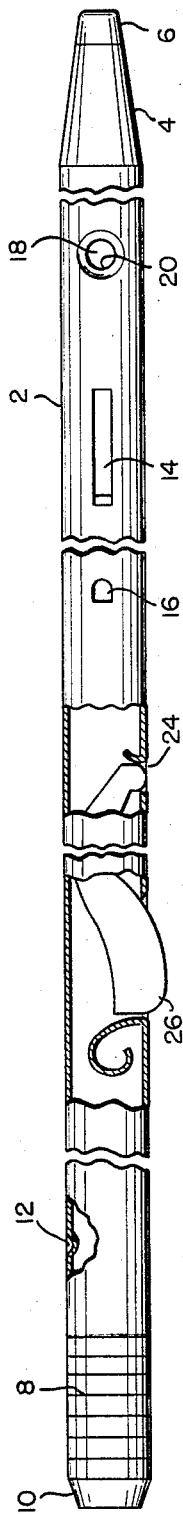
FIG. 1 is a plan view of an umbrella rod made on the machine according to the invention.

An umbrella tube 2 of this character, FIGS. 1 and 2, has a tapered terminal portion 4 tapering toward the end of the tube into a smaller size and carrying a tip 6 rigidly secured therein and closing the end of the tube. The opposite or handle end of the tube is formed with a knurled section 8 having a tapered terminal portion 10 of reduced diameter at the extremity of the tube to facilitate insertion of this end of the tube into one end of an umbrella handle. An indentation or positioning mark 12 is formed at a predetermined distance from the terminal portion 10 to indicate the position of the handle circumferentially of the tube 2 relative to the adjacent latch member and the extent the handle is engaged over the knurled section 8 of the tube 2 in rigidly securing the knurled section 8 and terminal portion 10 in an umbrella handle. This enables the handle to be conveniently positioned for manual operation of the latch.

The end portion of the tube 2 carrying the tip 6 is formed at a predetermined distance from the tip with a latch receiving slot 14 and a latch retaining slot 16 for receiving and mounting a conventional form of sheet metal umbrella latch which is detachably engaged through a slot 14 so that a projection on the end of the latch may be engaged in latch retaining slot 16 for retaining the latch in tube 2 in a well known manner. The latch engaged in the latch receiving slot 14 is positioned to engage and support a runner, not shown, in position on the tip end of the tube 2 with the umbrella in the open position in a manner well known in the art.

The umbrella tube 2 made according to the present invention, is formed with a stop projection 18 at a predetermined distance from latch receiving slot 14 toward the tip 6 so that the runner may be moved past a latch mounted in slot 14 sufficiently to allow the latch to project outwardly beyond the end of the runner to engage the end for holding the umbrella in open position. The stop projection 18 operates to prevent movement of the runner beyond the latch receiving slot 14 toward the tip 6 a sufficient distance to turn the umbrella inside out. The stop projection 18 is formed according to the present invention by pushing a portion of the tube wall outwardly to form an outwardly projecting bead on the tube. This is done by performing a punching operation from the opposite side of the tube formed with the stop projection 18. An aperture 20 is formed in the opposite side of the tube from the projection 18 so a punching tool may be moved through the tube a distance sufficient to engage the opposite inside wall of the tube and push it outwardly to a sufficient extent to form the stop projection 18.

The handle end of the tube is formed with a latch receiving slot 22 and a latch retaining slot 24 for receiving a conventional umbrella latch 26 with the retaining projection engaged in the latch retaining slot 24 and the latch portion projecting outwardly through the latch receiving slot 22 in a well known manner. The latch is positioned on the handle end of the tube 2 for engaging the runner to retain the umbrella in folded position on the tube 2. The same type of latch is used in slots 14 and 16 in a reverse position to hold the umbrella open. These latch receiving slots 14 and 22 are positioned in a predetermined spaced relation to each other, the tip and handle ends of the tube 2 according to the size of the umbrella and the operation required for movement into open and closed positions.

It will be understood that the tubes 2 may be made of various predetermined lengths and diameters for use in the manufacture of both men's and women's umbrellas which will include children's umbrellas of the various types and sizes being sold.

Figure 4:
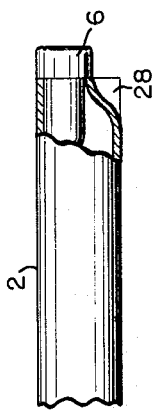
FIG. 4 is a longitudinal cross section through the end of a piece of tubing showing how the dimple holds a tip in the tube ready for swaging.
Figure 3:
FIG. 3 is a perspective showing one end of a piece of tubing formed with a dimple.

In making various lengths of tubing for use in forming an umbrella tube in the present machine according to the invention, it is customary to make tubing in substantially greater lengths than that desired for an umbrella tube of a given size and then cut off the tubing into a plurality of pieces of the desired length. It has been found desirable in cutting the tubing to the desired lengths for forming umbrella tubes to use a cutting device that will form a dimple 28 in the terminal portion at each end of a tube 2 to be used in forming an umbrella tube, as shown in FIGS. 3 and 4. The advantage of providing the dimple 28 in the ends of tubes 2 used in forming umbrella tubes will be pointed out hereinafter in connection with the construction and operation of the machine for automatically making umbrella tubes according to the present invention.

*Machine base and motor drive*

A base 30 provides the main support for mounting major portions of the operating mechanism for forming an umbrella tube according to the invention. The base 30 is of rectangular shape and has a flat horizontal top portion for detachably and adjustably mounting mechanism for forming an umbrella tube. The base has cam shaft bearings 32 at each of its four corners for rotatably mounting a plurality of cam shafts including a front cam shaft 34, a rear cam shaft 36, a right end cam shaft 38 and a left end cam shaft, 40, as shown in FIGS. 5B and 5C. A conventional electric main drive motor 42 is mounted on a conventional variable speed drive unit 44.

The variable speed drive unit 44 is mounted on the right end of the base 1, as shown in FIG. 5C, and has a drive shaft 46 carrying a drive pulley 48 having a plurality of belts 50 engaged thereover and over driven pulley 52 mounted on one end of a flywheel shaft 54 carrying a flywheel 56 at the opposite end. The flywheel shaft 54 carries a conventional clutch mechanism, not shown, operated manually by clutch lever 58. The clutch member includes a drive pinion intermeshed with the driven gear 60 mounted on the right end cam shaft 38 for driving the cam shaft 38 when the clutch is engaged to transmit power from the flywheel shaft 54. The clutch lever 58 is pulled forwardly into the position shown in dotted lines in FIG. 5C in the engaged relation for operating a control switch 62 which controls the circuits for the operation of the various parts of the mechanism on the machine in a manner hereinafter described.

A hand wheel 64 is mounted on the variable speed drive unit 44 for manual operation to vary the speed at which the drive shaft 46 is rotated with respect to the constant speed of the shaft of the main drive motor 42 for obtaining the desired speed of rotation of the flywheel shaft 54 and the right end cam shaft 38. All of the cam shafts 34, 36, 38, and 40 respectively, carry bevel gears at opposite ends thereof which intermesh with one another so they are all rotated at the same speed and angular synchronism.

The base and motor drive construction as hereinabove described without the control switch 62 is a conventional base and drive construction made by U.S. Tool Company, Inc., of East Orange, New Jersey, for use in mounting various types of machine parts for operation in the manufacture of a variety of products. This construction is modified by cutting off the rear end portion of the left end cam shaft 40 in a manner and for a purpose hereinafter described in connection with the present invention.

*Feed hopper assembly*

Figure 11:
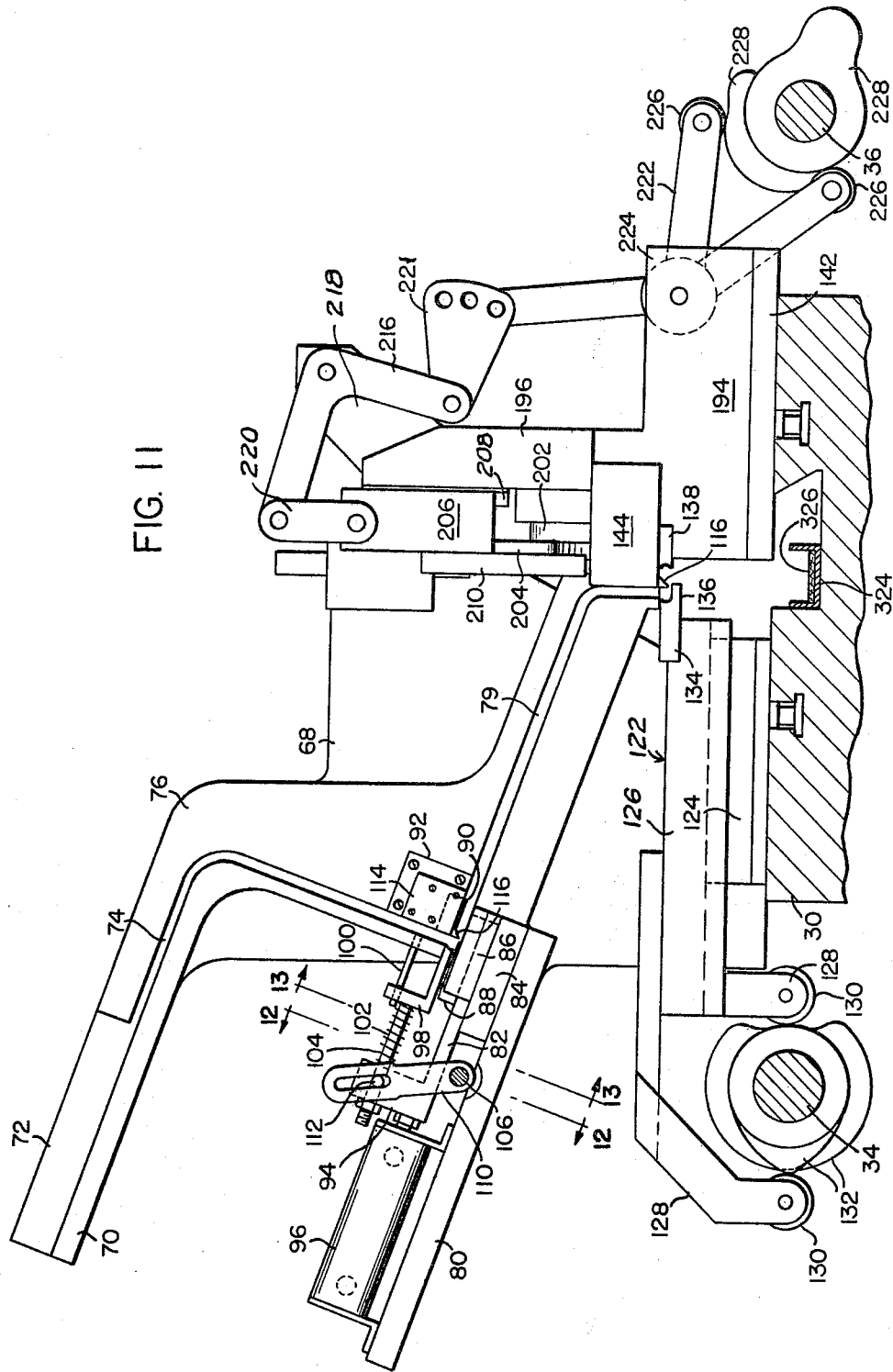
FIG. 11 is an enlarged vertical cross-section taken approximately on line 11—11 of FIG. 5C showing an inside elevation of the left hopper plate assembly with the tube knurling assembly, the die assembly and the adjacent tube slotting and punching assembly.
Figure 21:
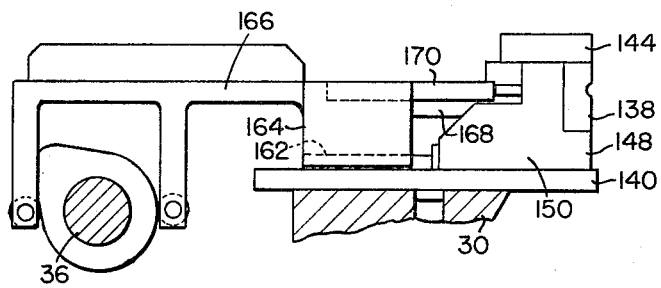
FIG. 21 is a side elevation of the horizontal punch and slotting assembly.
Figure 22:
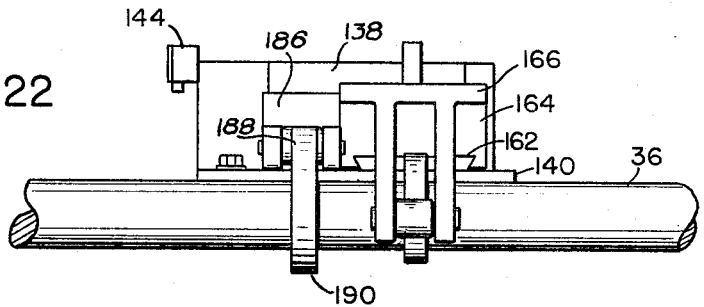
FIG. 22 is a rear elevation of the horizontal punch and slotting assembly.

The tube feed hopper has a right hopper plate 66 and a left hopper plate 68, FIGS. 5B, 5C and 11 formed in reverse but complementary relation to one another for cooperation to receive a supply of tubes to be formed in the several operations on the machine in providing finished umbrella tubes 2. The upper portions of the hopper plates 66 and 68 are formed with inwardly extending supporting flanges 70 extending toward each other for slidably receiving opposite ends of tubes 2 engaged between the plates in transversely extending relation, as shown diagrammatically in FIG. 5C. The right and left hopper plates 66 and 68 are each formed with the inwardly extending flanges 70 projecting forwardly and upwardly in inclined relation with respect to the front edges of the hopper plates.

These hopper plates also have vertically extending flanges 72 projecting forwardly and upwardly in inclined relation along the outer edges of the flanges 70 and spaced apart for slidably receiving tubes 2 in transversely extending relation for sliding and rolling movement on the flanges 70 downwardly and rearwardly into the guideways 74 formed in the inwardly projecting portions 76 of the right and left hopper plates 66 and 68, respectively. The guideways 74 on the hopper plates 66 and 68 respectively, extend in inclined relation rearwardly from flanges 70 and then curve downwardly into substantially upright portions extending to the lower ends of the inwardly projecting portions 76. The outer ends of the guideways 74 terminate in the same planes as the inner faces of flanges 72 to hold tubes 2 for sliding and rolling movement in the guideways 74 between the hopper plates 66 and 68 respectively, against endwise movement in the hopper plates except for sufficient clearance to provide for free movement of the tubes in the hopper assembly. This portion of the hopper construction provides an upper hopper section for receiving a supply of tubes to be fed into the machine. The movement of the tubes in the upper hopper section in guideways 74 is limited at the lower ends of the guideways 74 in the inwardly projecting portions 76 of the hopper plates in a manner hereinafter described.

The lower section has the hopper plates 66 and 68 respectively, formed with inwardly extending supporting portions 78 extending in inclined relation along the inner faces of the hopper plates and inclining downwardly from the front to the rear ends of the hopper plates. These inwardly extending supporting portions 78 are formed to provide guideways 79 similar to the guideways 74, extending from the front portion of the hopper plates in downwardly and rearwardly inclined relation to the rear end of the hopper assembly. The hopper plates 66 and 68 respectively, are formed at the forward ends of the inwardly extending supporting portions 78 with supporting bars 80 extending forwardly from the main portions of the hopper plates 66 and 68 in upwardly inclined relation at the same angle as the supporting portions 78, as shown in FIG. 11.

The supporting bar 80 on left hopper supporting plate 68 and the lower end of the inwardly projecting portion 76 provide a support for the knurling assembly and tube feed mechanism. The supporting bar 80 on the right hopper plate 66 provides a support for part of the tube feeding assembly.

*Knurling assembly and tube feed*

A slide member or bar 82 is slidably mounted on bearing block 84 detachably mounted on the upper face of supporting bar 80 formed as part of left hopper plate 68, as shown in FIGS. 11–13. The slide member 82 is slidably retained on the upper face of bearing block 84 by a recessed portion of the inwardly extruding portion 78 and gib 86 having the upper end extending inwardly over the upper side margin of the slide member 82. A movable knurling die 88 is detachably mounted on the rear upper face of the slide member 82 and has the upper surface formed with a plurality of longitudinally extending ribs to form the knurled section 8 on each tube 2. The movable knurling die 88 operates with a stationary knurling die 90 detachably mounted in a die supporting block 92.

The die supporting block 92 is detachably mounted in a recess formed in the lower end portion of the inwardly projecting portion 76 on left hopper plate 68 so the forward edge of the die supporting block 92 will cooperate with the inwardly projecting portion 76 at the rear edge of guideway 74 to form the rear side of the guideway in guiding tubes downwardly to the end of the guideway 74 and outwardly therefrom into engagement with the knurled surface of the movable knurling die 88. The stationary knurling die 90 and the die supporting block 92 are mounted on the left hopper plate 68 so that the lower surface of the die supporting block 92 will lie in the same plane as the portion of the inwardly extending supporting portion 78 of hopper plate 68 which forms the upper wall of the guideway 79 in the lower hopper section. The lower face of stationary knurling die 90 projects slightly below the lower face of die supporting block 92 and is formed with a plurality of complementary ridges and grooves to the ridges and grooves formed in the movable knurling die 88 in forming the knurled section 8 on each tube 2.

The stationary knurling die 90 has the lower surface extending from the rear edge of the guideway 74 rearwardly along the upper portion of the guideway 79 in the lower hopper section of the left hopper plate 68. The slide member 82 extends forwardly of the bearing block 84 in spaced substantially parallel relation over the supporting bar 80 and has the forward end formed with a head 94. A compressed air cylinder 96 is mounted on the forward end of the supporting bar 80 on the left hopper plate 68 in alined relation with the slide member 82 and has the piston rod connected with the piston in the cylinder at one end extending through the rear end of the cylinder and detachably and adjustably connected to the forward portion of the head 94 on the slide member 82 so that reciprocation of the piston in the cylinder 96 will reciprocate the slide member 82 back and forth on the bearing block 84.

A pusher member or bar 98 is formed with a laterally extending head portion slidably engaged on a pair of spaced parallel guide pins 100 mounted on the front face of the inwardly projecting portion 76 on the left hopper plate 68. These guide pins 100 extend forwardly from the inwardly projecting portion 76 in spaced parallel relation to each other and the supporting bar 80 for slidably guiding the pusher member 98 forwardly and rearwardly between the lower end of the inwardly projecting portion 76, the stationary knurling die 90 and the upper surface of the movable knurling die 88.

The pusher member 98 has an operating pin 102 secured to the head portion thereon and extending forwardly with the forward end slidably engaged in a bore extending through the head portion 94 of the slide member 82. A nut is adjustably threaded on the outer end of the operating pin 102 at the outer side of the head on the slide member 82 for limiting the rearward movement of the pusher member 98 relative to the slide member 82. A compression spring 104 is engaged about the operating pin 102 and maintained under sufficient compression to normally hold the pusher member 98 at its rear limit of movement relative to the slide member 82. When the slide member 82 and the piston in the compressed air cylinder 96 are in the forward position, the rear end of the pusher member 98 will lie slightly in advance of the forward edge of the guideway 74 in position to engage a tube 2 supported on the top face of the movable knurling die 88 in position to be fed from the upper hopper section through the knurling dies into the guideway 79 in the lower hopper section.

The supporting bar 80 on the right hopper plate 66 is provided with a bearing block 84 slidably mounting a slide member 82 and a pusher member 98, which is a duplicate construction of that above described, with the exception that the movable knurling die 88 and the stationary knurling die 90 are omitted since the tip end of the tube 2 omits the use of the knurled portion. Instead, the stationary die supporting block 92 carries a rubber insert of the same size as the stationary knurling die. A plastic block of the same size and shape as the movable knurling die is used to replace the movable knurling die for engaging and feeding the tip end of the tube 2 rearwardly and simultaneously with the operation of the movable knurling die and slide member 82 on the left hopper plate 68.

This simultaneous operation is obtained by providing a drive connection between the two slide members 82 mounted on the supporting bars 80 of the right and left hopper plates 66 and 68 respectively. For this purpose, an operating shaft 106 is rotatably mounted at opposite ends in bearing blocks 108. Two bearing blocks are provided one at each end of the shaft 106 mounted one on each supporting bar 80 against the inner edge thereof with the terminal portions of the shaft 106 extending over the upper faces of the supporting bars 80 outwardly beyond the bearing blocks.

A pair of feed levers 110 are mounted one on each end of the operating shaft 106 at the outer side of the bearing blocks 108 over the supporting bars 80 and rigidly attached thereto for rotating the shaft in the movement of the levers. The feed levers 110 are mounted between the bearing blocks and the slide members 82 with the free ends of the feed levers 110 extending upwardly along the inner side faces of the heads 94 on the slide members 82. The outer ends of the levers 110 are formed with longitudinally extending slots for slidably receiving operating pins 112, one mounted on each head 94 in inwardly extending relation from the inner face thereof and having the inner end engaged in the slot in the adjacent feed lever 110 so that movement of one of the slide members 82 will move the lever adjacent thereto for rotating the operating shaft 106 and correspondingly operating the other slide member 82 forwardly or rearwardly simultaneously therewith.

When the piston in the compressed air cylinder 96 is operated by compressed air to move the slide member 82 mounted on the left hopper plate 68 rearwardly it will operate to move the pusher members 98 and the slide members 82 rearwardly simultaneously through the connection provided by the feed levers 110, the operating shaft 106 and the operating pins 112. This will simultaneously move the pusher members 98 rearwardly to engage opposite ends of a tube 2 in the upper hopper section below the lower ends of the guideways 74 to move the tube rearwardly into the lower hopper section in the guideways 79.

During this operation of the slide members 82, the pushing of a tube 2 from below the lower ends of the guideways 74 will move the end of the tube engaged with the movable knurling die 88 to engage the stationary knurling die 90 as it moves rearwardly from the guideway 74. The end section 8 of the tube 2 is engaged between the knurling dies and rolled by the rearward movement of the slide member 82 and the movable knurling die 88 below the section 8 of the tube over the lower face of the stationary knurling die 90 to form a plurality of ridges and grooves in the section 8 of the tube 2.

The pusher members 98 cooperate in positively pushing the tube rearwardly so that when the tube has moved to a position immediately to the rear end of the stationary knurling die 90 it will become disengaged from between the knurling dies and moved into the guideways 79 for sliding and rolling movement rearwardly and downwardly to the lower end of the hopper. The pusher member 98 in cooperation with the plastic and rubber inserts operated by the slide member 82 on the right hopper plate 66 will simultaneously feed the end of the tube engaged therein rearwardly in the same manner as the end of the tube engaged by the operation of the knurling dies.

A pair of latch members 114 are mounted one at the lower end of each inwardly projecting portion 76 of the right and left hopper plates 66 and 68 respectively, on the die supporting blocks 92 along the inner faces thereof. The forward side of each latch member 114 is mounted in coincident relation with the rear edge of the guideways 74 and the lower side is coincident with the lower edge of the inwardly projecting portions 76 and the die supporting blocks 92. Each latch member 114, FIG. 14, is formed of a block secured to the inner face of the die supporting blocks 92 in the manner above described and is formed with a guide channel extending diagonally from the forward lower corner to the upper rear corner in one face thereof for slidably receiving a tube retaining latch 116.

The tube retaining latch 116 has an enlarged slotted central portion slidably engaged over a post 118 mounted in the latch supporting block to form an abutment for one end of a compression spring engaged between the post and the opposite end of the slot in the latch 116 for normally moving the latch downwardly to its lower limit of movement with the lower end extending below the lower face of the supporting block of the latch member 114. A detachable cover plate is mounted over the tube retaining latch 116 and is detachably secured to the supporting block mounting the latch for slidably retaining the latch in the supporting block.

When the latch members 114 have their supporting blocks mounted as above described, the lower ends of the latches 116 will project below the lower faces of the supporting blocks of the latch members into the transverse plane of the forward ends of the guideways 79. The latch 116 on the left hopper plate 68 will project downwardly to engage and hold a tube 2 on the movable knurling die at the bottom of the guideway 74. The slide member 82 carrying the plastic block substituted for the knurling die in the tube feed mechanism on the right hopper plate 66 will have the latch member 114 formed in reverse relation to the latch member used with the left hopper plate 68. The lower end of the tube retaining latch 116 on the right hopper plate 66 projecting downwardly in the transverse plane of the guideway 79 and will engage and retain the right end of the tube supported at the lower end of the guideway 74 on the plastic block.

The latch members 114, formed in reverse relation to each other are located in spaced relation inwardly from the guideways 74 and 79 respectively, as well as the slide members 82. However, when the pusher members 98 are operated to push the tube 2 rearwardly, this operation of the pusher members 98 and the slide members 82 will move the tube retaining latches 116 of the latch members 114 rearwardly and upwardly until the lower ends are moved into the latch members 114 so the tube being fed will move under the lower ends of the tube retaining latches 116 to disengage these latches and move into the guideways 79 for movement rearwardly by the pusher members 98, the cooperation of the knurling dies and the cooperation of the rubber and plastic blocks carried by the left and right hopper plates 68 and 66, respectively.

The plastic and rubber blocks and the knurling dies on the slide members 82 cooperate with the pusher members 98 on both of the hopper plates with the parts connected thereto for operation by the compressed air cylinder 96 to provide a feeding means for feeding tubes through the hopper into guideways 79 for rolling and sliding movement to the lower rear ends of these guideways.

The compressed air cylinder is operated by compressed air from a suitable source of supply under the control of a cam operated valve 120 in a manner that will be hereinafter described.

The right and left hopper plates 66 and 68 respectively, are formed with flanges extending laterally from the bottom edges thereof to provide a flat bottom surface for supporting the hopper plates in vertically extending relation on the flat top surface of the base 30. The base 30 is formed with longitudinally extending spaced parallel keyways which are used for accurately positioning various parts of the machine mechanism relative to one another in a fixed relation on the base. The right and left hopper plates 66 and 68 respectively are mounted on the base 30 at the front portion thereof and located over one of these keyways so that keys mounted on the lower face of each of the hopper plates and the flanges projecting from the sides thereof will locate the hopper plates in a predetermined position on the base 30. Suitable bolts or other securing means are used to rigidly secure the hopper plates to the base in adjusted position. The keys on the hopper plates and the keyway on the base 30 in which the keys are engaged will locate the rear lower ends of the guideways 79 in the hopper plates in a position for discharging each tube successively into a holding means where further forming operations are performed on the tubes.

*The tube holding assembly*

The tube holding assembly shown in FIGS. 5C, 11 and 15, is provided for receiving one tube at a time from the hopper assembly discharged at the lower ends of the guideways 79 and for moving and clamping a tube in an operating position where further forming operations are performed.

A pair of movable clamping or die members 122 are mounted in spaced parallel relation on top of the base 30 between the right and left hopper plates 66 and 68 respectively, for supporting an umbrella tube 2 in the two areas to be formed with the latch receiving slots. Each movable clamping or die member 122 is of substantially duplicate construction so that a description of one will suffice for both. A movable clamping or die member 122 has a supporting block 124 formed with a flat bottom face seated on the top face of the base 30 and provided with a key projecting below the bottom face for engaging in a keyway in the base 30 to locate the supporting block 124 in transversely extending relation on the base 30 in the desired predetermined position for engaging a tube 2 and supporting it throughout the area where it is formed with the latch mounting slots. Bolts or other securing means rigidly secure each supporting block 124 in the predetermined position on the base 30.

Any suitable means such as a dovetailed connection may be used for slidably attaching the clamping slide 126 to the supporting block 124. The forward end of the clamping slide 126 has two pairs of follower roller supporting arms 128 mounted thereon with the free ends extending downwardly in spaced parallel relation at opposite sides of the front cam shaft 34 and carry cam follower rollers 130 for cooperation with a pair of operating cams 132 mounted in spaced relation on the front cam shaft 34. The cams 132 through the cam follower rollers 130 and the follower roller supporting arms 128 reciprocate the clamping slide 126 on the supporting block 124 to move the clamping die 134 mounted on the upper rear end thereof from a position below the lower ends of the guideways 79 in the lower hopper section rearwardly into a position for moving a tube into an operating position where it is formed in a manner to be hereinafter described. The clamping die 134 is formed with a rounded upper portion having a curvature equal to that of a tube 2 to be received, supported and clamped in operating position when the clamping die moves to its rear position. The lower portion of each clamping die 134 is formed with a rearwardly projecting supporting arm 136 which receives a tube as it is discharged from the lower ends of the guideways 79 in the lower hopper section and supports this tube for movement toward the operating position. Other tubes 2 in the guideways 79 are supported one upon the other and the bottom tube engaged with the supporting arms 136.

A pair of stationary or clamping die members 138 are formed with a partially cylindrical tube receiving portion opposed and complementary to the curved tube receiving portions of the movable clamping members 122 and are in alined relation horizontally therewith, as shown in FIGS. 11, 15, 19 and 21. The stationary clamping or die member 138 positioned toward the right hand end of the machine from the other die member forms part of a horizontal cutting and punching assembly for forming the latch receiving and retaining slots 14 and 16 and the stop projection 18 at the tip end of an umbrella tube. The stationary die member 138 forming part of this assembly at the right of the other stationary die member is formed with a pair of sections in spaced parallel relation, connected at the top and having the lower ends secured to a base plate 140. The base plate 140 has a bottom flat surface engaged with the upper face of the base 30 and is provided with a key for engaging in a longitudinal keyway in the base 30 to accurately position the stationary die member 138 in the proper location transversely of the base 30 for receiving and tightly clamping a tube 2 in the operating position in the machine. This base plate 140 also carries the horizontal cutting and punching assembly which will be hereinafter described.

The stationary clamping or die member 138 toward the left hand end of the machine is mounted on a base plate 142 which carries a vertical sliding and punching assembly to be hereinafter described. The base plate 142 has a flat bottom face engaged on the upper face of the base 30 with a key formed on the bottom face to engage in the same keyway with the key on the base plate 140 in spaced and longitudinally alined relation. The stationary die members 138 have the partially cylindrical tube engaging portions of each die member provided on a separate piece that may be detachably mounted on the support for the die member so that it may be replaced when it is worn and so that a hardened piece of metal may be used to engage a tube 2 when clamped in the operating position. The partially cylindrical portions of each of the stationary die members 138 are mounted in coaxial relation.

The base plate 140 has a supporting block projecting upwardly from the right inner corner portion thereof for supporting one of a pair of latch members 144. The other latch member 144 is mounted on a supporting block carried by the right inner side portion of the base plate 142. The latch members 144 are of substantially duplicate construction to the latch members 114 used on the hopper construction and have spring-pressed latches 116 which are mounted in diagonal relation so the lower forward corner of each latch will project below the casing of the latch member. The latches 116 have the lower forward corners positioned to engage a tube 2 supported on the supporting arms 136 formed on clamping dies 134 for holding a tube discharged from the lower ends of the guideways 79 in position on the supporting arms 136 while the movable die members 122 are in the forward or open position spaced from the stationary die members 138.

When the movable die members 122 are moved rearwardly by the operation of the cams 132, the clamping dies 134 will have the partially cylindrical portion engage the tube supported on the supporting arms 136 and move it rearwardly against the rearwardly and upwardly inclined spring pressed latches 116 of the latch members 144. The latches 116 will be moved upwardly and rearwardly so the tube will pass under the lower ends of the latches into the operating position with the tube engaged with the partially cylindrical portions of stationary die members 138. The movable die members 134 when moved to the rear limit of movement will tightly clamp a tube 2 in the operating position in cooperation with the stationary die members 138.

After the tube 2 moves past the lower ends of the latches 116 of the latch members 144, the springs will return the latches so the forward ends will slide downwardly and project below the casing for the latch members with the rear face of the latches 116 engaging in front of the tube 2 clamped between the movable and stationary die members. When the movable die members 122 are moved forwardly away from the clamping position for holding a tube 2 tightly engaged with the stationary die members 138, the supporting arms 136 will disengage from under the tube 2 supported in the operating position. The lower ends of the latches 116 of the latch members 144 will engage and hold the tube 2 adjacent the stationary die members until the supporting arms 136 are disengaged from under the tube 2.

Each stationary die member has an ejector plunger 146 slidably mounted in the central portion thereof in a horizontal bore which contains a compression spring engaged about a stem on the inner end of the plunger 146. Whenever the movable die members 122 move toward the open or forward position away from the stationary die members 138, the ejector plungers 146 will move a tube from the operating position against the stationary die members 138 forwardly. The tube will be moved forwardly by the plungers 146 against the inclined back edges of the latches 116 of the latch members 144 and will then be ejected from the operating position downwardly.

When a tube 2 is clamped by the movable die members 122 against the stationary die members 138 in the operating position, a plurality of punches and cutters for forming the latch receiving slots 14, the latch retaining slot 16, the stop projection 18, aperture 20, latching receiving slot 22, latch retaining slot 24, and dimple 28, together with the insertion of a tip in one end of the tube are operated to perform their several operations. The forming means or horizontal cutting and punching assembly, for forming the latch receiving slot 14, the latch retaining slot 16 and the stop projection 18 and aperture 20 will now be described.

*Horizontal slotting and punching assembly*

The base plate 140 adjustably mounted on the base 30 detachably mounts the horizontal punching and slotting assembly. This assembly, shown in FIGS. 5C and 18 to 23, has a supporting block 148 with the bottom face seated on the top face of the base plate 140 and detachably secured thereto at the forward end of the base plate. The supporting block 148 has end walls 150 extending upwardly at opposite ends thereof formed with the upper front corners provided with rectangular recesses for receiving opposite ends of the stationary clamping or die member 138 carried by the horizontal punching and slotting assembly. The end portions of the stationary die member 138 mounted in the end walls 150 have the front faces flush with the front face of the supporting block 148 and the base plate 140 with horizontally alined intermediate portions formed with alined substantially semi-cylindrical grooves for receiving and retaining a tube 2 in the operating position.

The intermediate portion of the stationary die member 138 has a section below the top portion omitted to provide for operation of the cutting and punching or forming means between the end portions of the die formed with the tube supporting grooves. The stationary die member 138 has the top portion forming a connection between the end portions above the positions where the forming means operate to engage and form a tube in the operating position. The stationary clamping or die member 138 is rigidly secured to the end walls 150 of the supporting block 148 by suitable means such as bolts or the like. The die member 138 may have its position adjusted in the end walls 150 through the use of suitable shims between the end walls 150 and the adjacent portions of the stationary die member 138 or by any other suitable means. This provides a structure where the stationary die member 138 may be accurately positioned to hold a tube 2 in the operating position for the slotting and cutting operations thereon.

The supporting block 148 has a rotary cutter head 152 rotatably mounted on a pivot post 154 and a radially extending operating arm 155 extending over the top face of the supporting block toward the left hand end and the rear side thereof. The upper end of the rotary cutter head 152 is formed with a radial slot for receiving a radially extending cutter 156 which is rigidly secured in the slot by suitable fastening means and further retained by the retainer plate 158 detachably mounted on the upper end of the cutter head 152. This radially extending cutter 156 in the inoperative position extends forwardly and toward the left end of the machine in inclined relation with the forward end terminating in spaced relation in the rear of a tube 2 engaged in the stationary clamping or die member 138 substantially in the horizontal plane of the axis of the tube in the operating position. The outer end of the radially extending cutter 156 which is of rectangular shape having opposite parallel faces and a thickness equal to the width of the latch receiving slot 14 is formed with the outer end extending toward the tube or the front of the machine provided with a partially circular recess 160 to form a cutting edge at the outer end of the cutter 156 with the partially circular recess 160 extending inwardly from the cutting edge. The partially circular recess 160 forms a curved section on the cutter adapted to cause the strip section cut from the tube by the cutter in the formation of the latch receiving slot 14 to curl into spiral form into the inside of the tube toward the tip end of the tube in the manner illustrated in FIG. 1.

The supporting block 148 is formed with a dovetailed guiderail 162 extending rearwardly from the left end thereof, as shown in FIG. 18, for slidably mounting the cutter operating block 164 formed with a dovetailed recess slidably receiving the guiderail 162. The cutter operating block 164 has a cam engaging arm 166 mounted on the rear end thereof and extending rearwardly over the rear cam shaft 36 where it is formed with a pair of depending arms having cam follower rollers rotatably mounted in the lower ends thereof at opposite sides of the rear cam shaft 36 for engaging opposite peripheral portions of an operating cam on the rear cam shaft which reciprocates the cutter operating block 164 through the cam engaging arm 166 in the rotation of the cam on the rear cam shaft 36.

Figure 23:
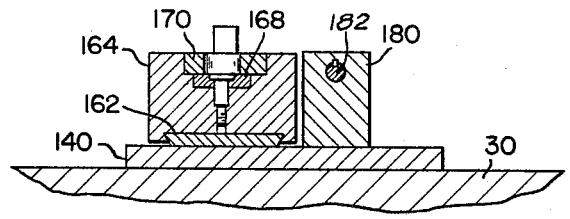
FIG. 23 is a detail cross-section of the horizontal punch and slotting assembly taken approximately on line 23—23 of FIG. 18.

The front end of the cutter operating block 164 is formed with a recess for receiving the rear end of cutter operating link 168 pivotally secured therein by a suitable pivot pin, FIGS. 20 and 23. The other end of the cutter operating link 168 extends forwardly in angular relation and is pivotally secured to the outer free end of the radially extending arm 155 of the rotary cutter head 152. The recess in the forward end of the upper face of the cutter operating block 164 also mounts the rear end of the punch supporting plate 170, FIGS. 18 and 21, suitably secured by screws or the like for rigidly holding the supporting plate 170 on the block. The forward end of the punch supporting plate 170 is tapered toward a narrow end as shown in FIG. 18 for detachably supporting a punch 172 constructed to form the latch retaining slot 16 in a tube 2, as shown in FIGS. 1 and 2.

When the cutter operating block 164 is reciprocated by the operation of the cam on the rear cam shaft 36, operatin cam engaging arm 166, the cutter head 152 will be rotated to move the cutting edge of the cutter 156 to engage and cut the slot 14 in a tube 2 in horizontal relation therein when the tube is supported in the stationary die member 138. The punch 172 will be operated to punch the latch receiving slot 16 in horizontal relation in the tube and in alined relation with the slot 14 simultaneously with the formation of the slot 14. The punch 172 is formed to progressively cut a strip from the tube in forming the slot 16 which is forced inwardly and bent toward the handle end of the tube, as shown in FIG. 1. In the formation of the latch receiving slot 14 in a tube 2 the rotary motion of the cutting edge of the cutter 156 will form an inclined end wall 174 at the end of the slot 14 extending toward the slot 16 as shown in FIG. 1, before the cutter in its rotary motion cuts entirely through the thickness of the tube to the inside thereof in the formation of the slot 14.

The supporting block 148 is formed with an upwardly extending portion 176 at the forward end and at the left side thereof extending into the cut-out portion in the die member 138 where it is formed with an aperture 178 to slidably receive and guide the punch 172 in its holder adjacent to the tube 2 during the punching or the slots 16 in a tube 2.

A punch mounting block 180 is detachably mounted or formed on supporting block 148 for slidably mounting a stop forming punch rod 182. The punch rod 182 is slidably mounted in horizontally extending relation in the stop mounting block 180 in substantially horizontal relation with a tube 2 clamped in the operating position. A punch 184 is formed with a rounded outer end portion adapted to punch a hole in one side of a tube 2 in operating position and then move substantially diametrically across the interior of the tube 2 so the rounded end of the punch will engage the inner wall of the tube at the opposite side and push it outwardly to form the stop projection 18.

The stop forming punch rod 182 has a bracket 186 mounted on the rear end thereof formed with a pair of rearwardly and downwardly projecting arms rotatably mounting the cam follower roller 188 for engaging the operating cam 190 mounted on the rear cam shaft 36. A compression spring 192 is mounted on the stop forming punch rod 182 between the bracket 186 and the rear end of the punch mounting block 180 for normally moving the stop forming punch rod 182 rearwardly to maintain the cam follower roller 188 in engagement with the periphery of the cam 190. The punch 184 is adjustably mounted in the stop forming punch rod 182 in a position so that the rounded end on the punch will be positioned so that the punch will form the hole 20 in one side of a tube 2 and then move a sufficient distance to form the stop projection 18 so that it will project outwardly beyond the outer surface of the tube 2 a predetermined amount sufficient to engage and stop the movement of a runner along the umbrella tube.

The horizontal punch assembly has the punches 172 and 184 together with a cutter 156 operated simultaneously by the two cams on the rear cam shaft 36 for forming the latch retaining slot 16, the latch receiving slot 14, and the stop projection 18, respectively, as they are moved forwardly with the cutter 156 moving in an arcuate path until the several slots and the stop projection have been completed. The punch 172 will cut the material out of the tube in forming the latch retaining slot 16 so that it will form a strip projecting inwardly from one end of the slot opposite that adjacent to the latch receiving slot 14, in the manner shown in FIG. 1. The rotary movement of the radially extending cutter 156 with the partially circular recess 160 in cutting the latch receiving slot 14 will cause the strip of material removed from the tube 2 in the formation of the slot to curl within the tube toward the tip end of the tube into the position shown in FIGS. 1 and 2.

*Vertical punching and slotting assembly*

The vertical punching and slotting assembly is illustrated in FIGS. 5C, 11, and 15–17 inclusive. It is mounted on the base plate 142 and has a stationary supporting block 194 detachably mounted on the base plate 142 and formed with an upwardly extending plate portion 196 for supporting the movable parts. A rotary cutter head 198 similar to the rotary cutter head 152, carries the radially extending cutter 200 extending downwardly in angular relation toward the right end of the machine for rotation in a reverse direction to the cutter head 152 in cutting the latch receiving slot 22.

The cutter head 198 is rotatably mounted on a pivot post 199 extending horizontally and forwardly from the upwardly extending plate portion 196. The rotary cutter head 198 has the radially extending operating arm 202 connected by a cutter operating link 204 which is constructe din the same manner as the operating arm 155 and the cutter operating link 168. The upper end of the cutter operating link 204 is pivotally connected to the lower end portion of the cutter operating block 206 in a recess in the lower central portion thereof in the same manner as the connection between the cutter operating link 168 and operating block 164.

The cutter operating block 206 has a slidable dovetailed mounting with the dovetailed guide rail 208 formed on the front face of the upwardly extending plate portion 196 at the upper end portion thereof. A punch supporting plate 210 is mounted on the front face of the cutter operating block 206 and carries a slotting punch 212 at the lower end thereof which is constructed to form the latch retaining slot 24 in each tube 2 while it is held in the operating position against the stationary die or clamping members 138. The punch supporting plate 210 and slotting punch 212 are constructed as substantial duplicates of the punch supporting plate 170 and punch 172 and operate in the same manner during the reciprocation of the operating block 206 with the cutter positioned to perform its tube slotting operation in forming the latch retaining slot 24 in a direction opposite to the manner in which the latch retaining slot 16 is formed in a tube 2. A guide bar 214 is mounted on the upper side of the clamping or die member 138 carried by the base plate 142 and the supporting block 194 with an aperture formed therein for guiding the slotting punch 212 during its downward movement to form a slot in a tube 2 held in operating position against the stationary clamping member 138.

A pair of bellcrank levers 216 are mounted in spaced parallel relation on opposite sides of the supporting arm 218 with the forwardly extending ends of the bellcrank levers 216 having a pair of links 220 connecting the ends of the respective levers 216 in pivotal relation with the upper end of the cutter operating block 206. The opposite ends of the bellcrank levers 216 extend downwardly in the rear of the upwardly extending plate portion 196. The lower ends have an adjustable link connection through a pair of links 221 with an upwardly extending arm of the cam follower lever 222.

The cam follower lever 222 has the central portion rotatably mounted on a shaft carried by rearwardly extending wall portions 224 on opposite sides of the stationary supporting block 194. The cam follower lever 222 has pairs of spaced rearwardly extending arms carrying cam follower rollers 226 for engagement with the operating cams 228 mounted on rear cam shaft 36. The cam follower rollers 226 and the pairs of arms supporting them are arranged in spaced relation on opposite sides of the shaft 36 and the operating cams 228. The operating cams 228 are formed to operate the cam follower lever 222 to reciprocate the cutter operating block 206 vertically on the upwardly extending plate portion 196 and the dovetailed guide rail 208 for moving the radially extending cutter 200 and the slotting punch 212 back and forth in a substantially vertical direction for cutting the latch receiving slot 22 and the latch retaining slot 24 in a tube 2.

The radially extending cutter 200 and slotting punch 212 are operated simultaneously to cut the latch receiving slot 22 and the latch retaining slot 24 in a tube 2 in a position in which the latch retaining slot 24 is reversed in a position to the latch receiving slot 22 compared with the relative positions of the latch retaining slot 16 and the latch receiving slot 14, as shown in FIGS. 1 and 2. Otherwise, the operation of the cutter 200 and the slotting punch 212 is the same as the operation of the cutter 156 and the punch 172, heretofore described in connection with the description of the horizontal punching and slotting assembly. This vertical slotting and punching assembly in having the radial cutter 200 and slotting punch 212 reciprocated in a vertical plane will form their respective slots in a tube 2 clamped in the operating position in a position spaced approximately ninety degrees about the tube from the position of the slots formed by the horizontal slotting and punching assembly.

The operation of the machine is such that the rear cam shaft 36 and the cams positioned thereon for operating both the horizontal and vertical cutting and punching assemblies will operate the cutters and punches in a timed relation so that the cutting and punching of the two assemblies is performed substantially simultaneously while a tube 2 is held in the operating position against the stationary clamping or die members 138.

*Tip feeding and holder assembly*

A tip holding and feed unit indicated at 230, FIG. 5C, has a housing mounted on a supporting framework 232 attached on the right end of the base 30 and extending upwardly and outwardly from the right end of the base for location above the base and above the operating position for a tube 2. This tip holding and feed unit 230 has a hopper which is mounted for oscillating movement on the casing of the unit which holds and agitates a supply of tips in the hopper so they can be fed one at a time into an inclined chute 234. The inclined chute 234, FIG. 5C, extends downwardly from the unit 230 in inclined relation toward the end of the machine bed 30 and carries a solenoid operated feed valve indicated at 236 on the lower end thereof. This feed valve 236 is electrically operated by a solenoid to discharge one tip at a time from the end of the chute 234 when a microswitch 237 is operated in a manner to be hereinafter described in connection with the wiring diagram. As the solenoid operated feed valve 236 is operated to discharge one tip at a time, the tip will be discharged into a flexible tube 238 at one end for passage through the tube into the tube holder 240 at the opposite end thereof.

The tip holding and feed unit 230, the chute 234, the solenoid operated feed valve 236, the flexible tube 238, and the tube holder 240 is a conventional type of pneumatic rivet and screw feeding construction made by Clyde Engineering and Manufacturing Corporation of 1700 West Maple Road, P. O. Box 150, Birmingham, Michigan. The details of construction of the tip holding and feed unit 230 and the associated parts as hereinabove described is not illustrated in detail in view of its being well known in the art.

The tip holder 240, FIGS. 5C to 10, forming part of the conventional tip holding and feed unit has been modified in part. This tip holder 240 has a body 242 formed with a longitudinally extending passage 244. A pair of tip retaining arms 246 are pivotally mounted on opposite sides of the body 242 in recesses formed therein on opposite sides of the delivery end of the passage 244. The ends of the arms at the delivery end of the body have inturned fingers extending toward each other indicated at 248 formed to embrace the head and shank of a tip 6.

The fingers 248 are engaged about the shank of the tip 66 with the head seated against shoulders formed by the fingers for holding a tip against discharge outwardly through the fingers until force is applied to project the tip outwardly. The fingers 248 have the shoulder portions for engaging and holding the tip slightly inclined, see FIG. 9, so that when sufficient force is applied from the inside on the head of the tip, the fingers 248 and the tip retaining arms 246 will move outwardly away from each other against the tension of compression springs engaged between the opposite ends of the tip retaining arms 246 and the adjacent portions of the body 242.

A tip holding latch 250 is pivoted in a recess in the body 242 and has a compression spring between one end thereof and the bottom of the recess for normally forcing the beveled retaining finger 252 into the passage 244 with the outer edge spaced inwardly from the inturned fingers 248 sufficiently to engage the end surface of the head on a tip 6 engaged between the fingers 248. This bevel retaining finger 252 provides for the movement of a tip through the passage 244 so the head will engage the beveled end of the finger 252, move it outwardly against the tension of the spring operating the finger and then move into engagement with the shoulder portion on the fingers 248. The bevel retaining finger 252 will then drop or extend into the passage 244 to engage the end of the head of the tip 6 for retaining it in position between the inturned fingers 248 of the tip retaining arms 246 against relative movement in the body 242.

The flexible tube 238 has one end secured to a fitting detachably engaged on an angular extension 254 on the body 242 of the tip holder 240 and formed with a feed passage 256 for conveying tips from the flexible tube 238 into the passage 244 and into position between the inturned fingers 248 of the tip retaining arms 246 in the manner hereinabove described. When the solenoid operated feed valve 236 is operated to feed one tip from the chute 234 into the flexible tube 238, the operation of the valve to feed the tip and then cut off the passage end of the tube 238 will provide for the exhaust of compressed air into the tube 238 for blowing a tip through the tube 238, through the feed passage 256 and the passage 244 to the position between the inturned fingers 248 of the tip retaining arms 246.

The body 242 is formed with a flat bottom face mounted on the top face of the tip holder plate 258 having opposite ends extending beyond opposite sides of the body 242 and detachably secured to suitable supporting blocks 260 mounted in spaced relation and secured at the lower ends to the upper surface of the base 30 of the machine.

The spacing of the supporting blocks 260 is such that a tip operating slide block 262 is slidably mounted in a guideway in the base 30 at the right end of the machine and has a cam follower roller 264 mounted in the slotted outer end thereof for engaging the periphery of the operating cam 266 mounted on the right end cam shaft 38. A compression spring normally operates the tip operating slide block 262 to maintain the cam follower roller 264 in engagement with the periphery of the operating cam 266. A slide plate 268 is detachably mounted on top of the slide block 262 and carries a supporting bracket 270 detachably and adjustably mounting one end of a tip pusher bar 272.

The tip pusher bar 272 has the other end slidably mounted in a bore formed in the body 242 in axial alinement with the passage 244. The tip pusher bar 272 has an inner reduced end formed thereon extending into the passage 244 for movement from the outer end of the passage toward the discharge end thereof to engage the head of a tip held by the tip retaining fingers 248 and force the tip outwardly from between the fingers by forcing the fingers apart until the shank of the tip is engaged in the end of a tube 2 clamped in the operating position by the die blocks hereinbefore described. The tip pusher bar 272 will operate to push the tip outwardly from the body 242 and the inturned fingers 248 until the head on the tip 6 is entirely clear of the inner end of the body 242 and has the shoulder portion about the shank on the tip engaged with the end of the tube 2. The shank on the tip engages the dimple 28 formed on the end of the tip. The dimple 28 is formed in the terminal portion of the tube to engage the shank of the tip with a sufficient gripping action to hold the tip in position in the tube until it is swaged.

The operation of the operating cam 266 for moving the tip pusher bar 272 to feed a tip from between the inturned fingers 248 of the tip retaining arms 246 into the end of a tube is timed so that the feeding of a tip into the tube 2 will take place immediately after the horizontal and vertical cutters and punches have completed their cutting and punching operations and have moved back toward their inoperative positions sufficiently to disengage a tube 2 held in the operating position against the stationary clamping or die members 138.

In the reciprocation of the slide block 262, the plate 268, and the tip pusher bar 272 on the bracket 270, a switch operating cam 274 mounted and projecting outwardly from the rear side of tip operating slide block 262 will have the inclined outwardly projecting portion of the switch operating cam 274 engage and operate the roller on the arm of the microswitch 237 for closing the circuit controlled thereby when the tip pusher bar 272 and slide block 262 are in the return position. The circuit closed by the microswitch 237 is also controlled by a microswitch 239 mounted on the machine bed 30 for operation by the projection 241 on the cam 243 on right cam shaft 38. When the projection 241 operates the microswitch 239 it closes the contacts thereof long enough to energize the solenoid for operating tip fed valve 236 for reciprocating this valve to feed one tip from the chute 234 into the flexible tube 238. When the valve 238 moves back to its starting position it controls the discharge of compressed air into the flexible tube 238 for blowing this tip through the tube into position between the inturned fingers 248 of the tip retaining arms 246 in the manner hereinbefore described.

The tip holder 240 and body 242 thereof is mounted so that the inner end where a tip is held between the inturned fingers 248 will be positioned adjacent to the right hopper plate 66 with the shank of the tip having the inner free end spaced a slight distance outwardly beyond the bottom of the guideway 79 in the right hopper plate 66. The tip held by the fingers 248 will be alined with a tube 2 held in the operating position. When the tip is discharged from between the inturned fingers 248 by the tip pusher bar 272 the outer end of the head on the tip will be spaced inwardly from the adjacent end of the body 242 when the tip is engaged in the tube 2 with the head contacting the end of the tube. This provides clearance between the head of the tip and the body 242 so the tube 2 with a tip engaged in the end thereof can be discharged from the operating position free of engagement with any part of the tip holder 240 and its operating mechanism.

*The crimper assembly*

The crimper assembly is shown principally in FIGS. 5B and 5C, and 24–27 inclusive. The purpose of the crimper assembly is to provide the inturned or beveled terminal portion 10 on the handle end of the tube 2.

Figure 26:
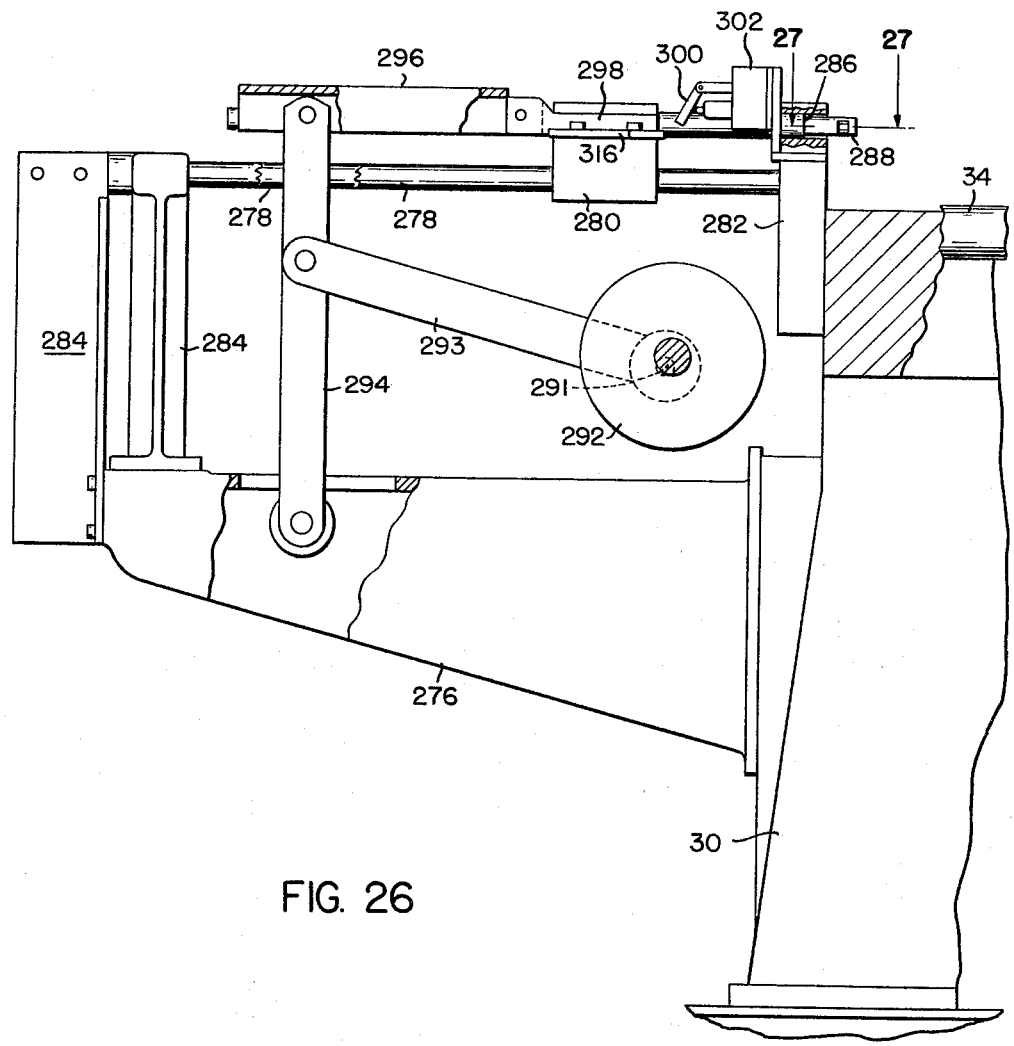
FIG. 26 is a front elevation of the crimper assembly.

The crimper assembly has a supporting frame 276 with one end mounted on the left end of the base 30 below the top portion thereof and the opposite end projecting outwardly toward the left from the base. The supporting frame 276 is positioned below the left end cam shaft 40 as shown in FIG. 26. A pair of spaced parallel guide rails 278 extending in longitudinal relation beyond the end of the base 30 and above the supporting frame 276 in substantially horizontal relation, slidably mount the crimper supporting block 280 for reciprocating movement between opposite ends thereof. The inner or right ends of the guide rails 278 are mounted on a supporting block 282 detachably secured on the end of base 30 and having the upper end projecting slightly above the upper surface of the base. The opposite ends of the guide rails 278 are secured to the supporting posts 284 mounted on the outer end of the supporting frame 276.

A crimper bar 286 of substantial length is detachably and adjustably mounted in the crimper supporting block 280 so that it may be adjusted to crimp the handle end of umbrella tubes 2 of a predetermined length according to the size for which the machine is set up. The inner end of the crimper bar 286 has a crimper head 288 detachably mounted thereon, as shown in FIG. 27, at one end with the free end formed with a recess for receiving the end of a tube 2 for forming it inwardly into tapered or inclined relation to reduce the diameter of the terminal portion compared with the size of the tube, as shown in FIG. 1.

The conventional machine base construction is modified by having the left cam shaft 40 cut off so that only a short portion mounted in the front left bearing 32 remains. A gear 289 is mounted on the end of the left cam shaft 40 adjacent the cam shaft bearing 32 at the front of the base 30. A gear 290 is mounted on the forward end of a crimper operating shaft 291 and intermeshes with the gear 289 for driving the shaft 291 from the left cam shaft 40. The shaft 291 is rotatably mounted in a bearing bracket secured to the under side of the bearing 32 at the left front end of the base 30. The eccentric drum 292 is mounted on the rear end of the crimper operating shaft 291 and carries an eccentric pin for reciprocating the operating link 293 pivoted thereto at one end and having the opposite end pivotally connected to an operating lever 294. The lower end of the operating lever 294 is pivotally mounted on the outer end of the supporting frame 276, with the operating link 293 connected to an intermediate portion of the operating lever 294 and the upper end pivotally connected to a horizontal connecting link 296 at one end. The opposite end of the horizontal connecting link 296 is pivotally connected to a bracket 298 mounted on the central portion of the crimper supporting block 280.

Figure 24:
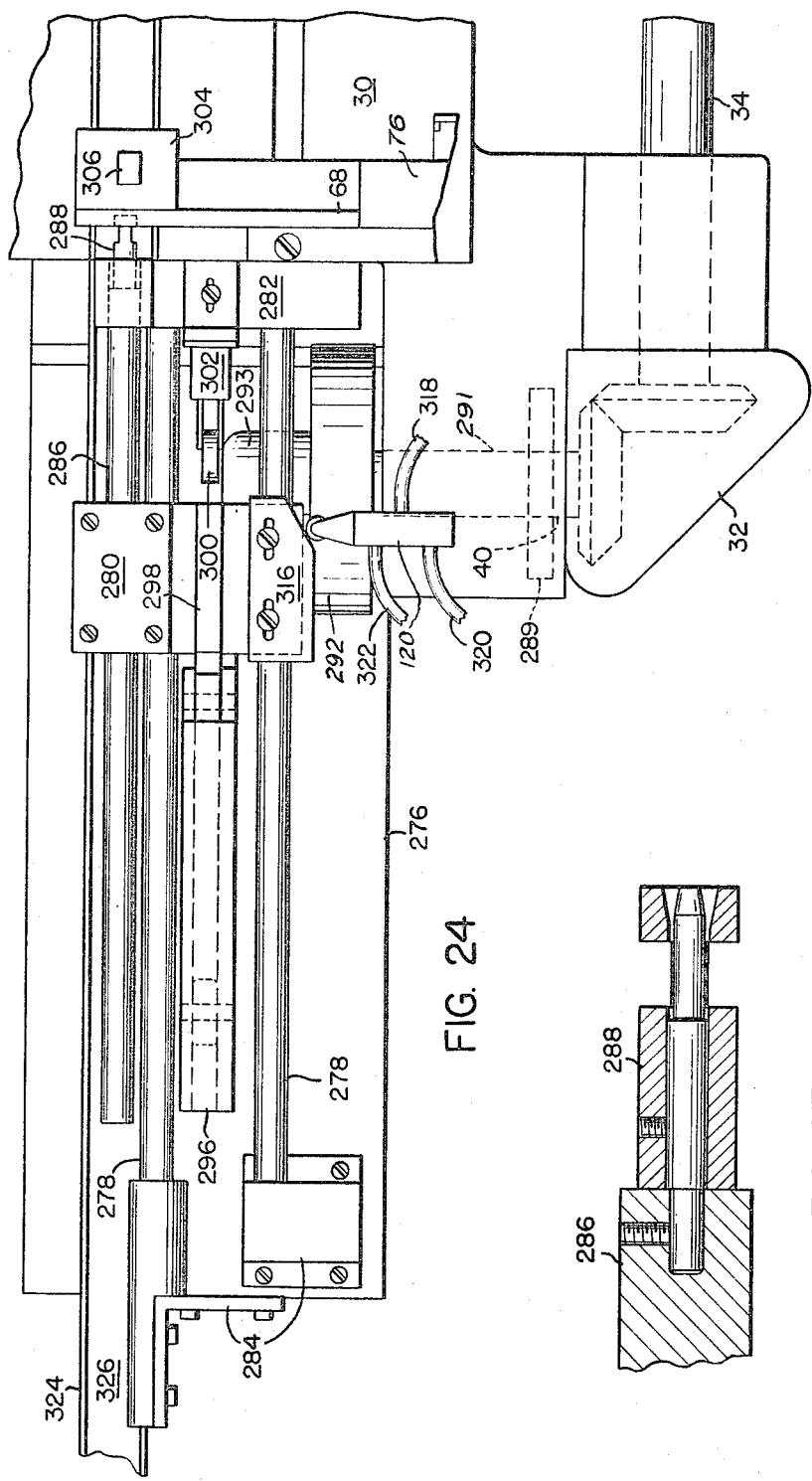
FIG. 24 is an enlarged plan view of the crimper assembly and a portion of the left hopper plate.
Figure 25:
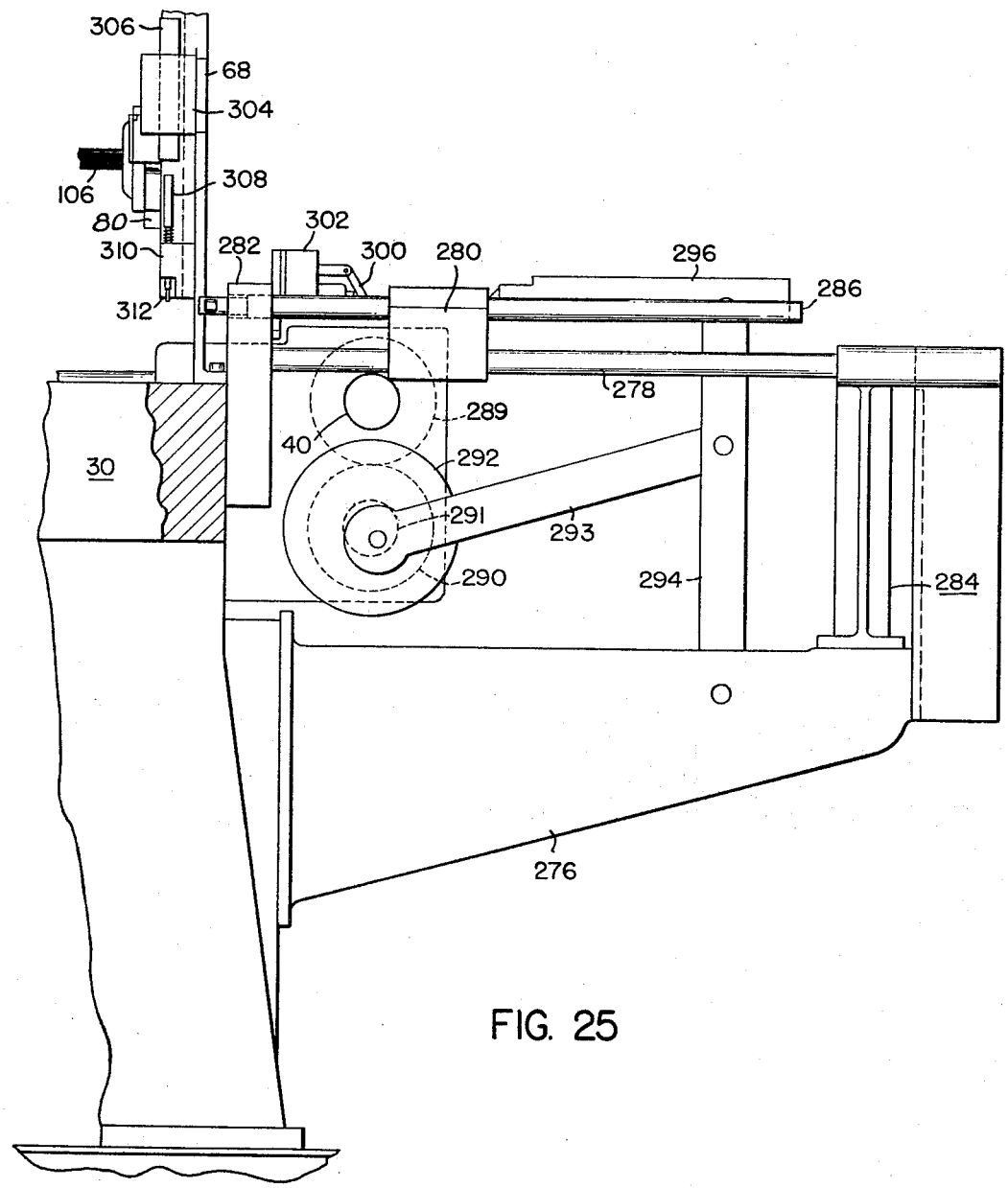
FIG. 25 is a rear elevation of the crimper assembly and hopper plate as shown in FIG. 24.

The inner end of the crimper bar 286 is slidably supported in the supporting guide block 282 mounted on the end of the base 30, as shown in FIGS. 24 and 26. The crimper bar 286 is located in axial relation to a tube 2 in the operating position so that when the crimper supporting block 280 is moved to the return position at the left hand end of its movement on guide rails 278, as shown in FIGS. 5B, 5C and 26. The inner end of the crimper head 288 will be in a position spaced slightly outward from the handle end of a tube in the operating position.

This crimper assembly is located at the end of the base 30 so that it will be to the left of the left hopper plate 68 with the inner end of the crimper head 288 in the left hand or return position alined with the lower rear end of the lower hopper section slightly spaced from the outer or bottom of the guideways 79 and below the lower ends thereof.

The eccentric drum 292 has the eccentric for operating the operating link 293 positioned so that in the operation of the machine an umbrella tube 2 will be fed into the operating position where it is clamped and slotted in the manner hereinabove described. A tip is also positioned to be inserted in the end of the tube at the right of the machine as soon as the cutters and punches are withdrawn from contact with a tube 2 in the operating position. Then, as above described, a tip is fed into the end of the tube. At the same time, the eccentric on eccentric drum 292 operates the operating link 294 to move the crimper bar 286 inwardly so the inner end of the crimper head 288 will engage the handle end of the tube.

The tip pusher bar 272 will engage the end of the tip in the tube 2 and hold it in the operating position against endwise movement while the crimper head 288 is moved by the crimper bar 286 to engage the opposite end of the tube and move the crimper head inwardly over the end to form the tapered outer end or terminal portion 10, as shown in FIGS. 1 and 2, on the handle end of a tube 2. The pusher bar 272 cooperates with the stationary clamping members 138 in holding the tube 2 against endwise movement while in the operating position and while the crimper head 288 moves to its inner limit of movement in forming the tapered end on the terminal portion 10.

When the crimper supporting block 280 moves the crimper head 288 to form the tapered terminal portion 10 on the end of a tube 2, it will engage the operating lever 300 for the microswitch 302 for engaging and moving the operating pin for the microswitch 302 into the closed position to close the electrical circuit to the marker solenoid 304 for energizing this solenoid to move its armature 306 downwardly to engage and operate the marker plunger 308. The marker plunger 308 has a reduced lower end portion slidably engaged in the bearing portion 310 on the rear end of the left hopper plate 68 to the rear of the rear lower end of the guideway 79. A compression spring is engaged about the reduced lower end portion of the marker plunger 308, is seated on the upper end of bearing portion 310 and engages the shoulder formed on a reduced portion of the marker plunger 308 where it joins the upper end thereof for normally holding the marker plunger 308 at its upper limit of movement in inoperative position.

The lower end of the marker plunger 308 carries a marker tool 312 having the lower extremity formed to provide an indentation in the wall portion of the tube directly below the marker plunger when it is supported in the operating position. The marker tool 312 forms the metal of the tube inwardly around the end of the tool to provide a mark 12 for visual use in manually applying a handle over the knurled section 8 of a tube in which the end of a handle will be positioned at the indentation of mark 12. The operation of the armature 306 by energization of the solenoid 304 moves the marker plunger 308 downwardly to engage the marker tool 312 with the end portion of a tube clamped in the operating position against the stationary clamping members 138 in forming this indentation or mark 12 in a tube 2. This operation is performed through the energization of the solenoid 304 while the crimper head 288 and the tip pusher bar 272 are moved to their inner limits of movement for supporting and crimping the handle end of the tube while holding the tip in the tip end of the tube.

At the same time that the crimper supporting block 280 moves to its inner limit of movement, it will also operate a compressed air control valve 120, FIGS. 5B and 5C and 24, by means of the valve operating cam bar 316 mounted on the forward end of the crimper supporting block 280. The inclined cam surface on valve operating cam bar 316 engages a roller on the adjacent end of the valve member of the air control valve 120 for connecting the compressed air supply pipe 318 with a flexible tube 320. The opposite end of the flexible tube 320 is connected to the compressed air cylinder 96 at the front end for delivering compressed air to the cylinder 96 to move the slide member 82 and pusher bar 98 rearwardly to feed a tube from the upper hopper section to the lower hopper section and knurl the handle end of the tube to form the knurled section 8, in the manner hereinbefore described.

As the crimper supporting block 280 moves toward its return position after crimping the end of a tube 2 in the operating position, the valve operating cam 316 will disengage the roller on the valve member of the compressed air control valve 120. The valve member will be moved by internal spring operation to close the passage between the compressed air supply pipe 318 and the flexible tube 320 and open a connection between the compressed air supply pipe 318 and a flexible tube 322. The flexible tube 322 is connected to the valve 120 at one end and to the rear end of the compressed air cylinder 96, FIG. 11, for moving the piston forwardly in the cylinder and moving the slide member 82 forwardly with the pusher bar 98 to the return position to complete a cycle of operation of the knurling and tube feeding assembly.

When the operations on a tube 2 clamped in the operating position against the stationary clamping or die members 138 by the movable clamping or die members 122 are completed, the movable die members are moved away from the stationary clamping or die members toward the front of the machine until the movable clamping members 122 are in the open position, see FIG. 11. The ejector plungers 146 mounted in the stationary clamping or die members 138 will move a tube 2 from the operating position away from the stationary clamping members 138 as the movable clamping members 122 move out of clamping position so as to disengage and discharge the tube from the operating position. As the tube leaves the clamping position in the stationary clamping or die members 138, it will engage the inclined rear edges of the pair of spring pressed latch members 144 and be ejected downwardly from the movable and stationary clamping or die members on to a conveyor belt for being conveyed to the swager assembly.

*The conveyor*

The top portion of the base 30 has a longitudinally extending slot formed therein directly under the stationary clamping or die members 138 in position to receive umbrella tubes 2 discharged from the operating position as the movable clamping or die members 122 are moved to the open position. A conveyor supporting track 324, FIGS. 5A, 5B, 5C and 11, in the form of an elongated U-shaped channel bar has the right end mounted in the longitudinal slot formed in the top portion of the base 30 with the right hand end extending to a position slightly to the right side of the base plate 140, as shown in FIG. 5C for receiving one end of the top flight of the endless conveyor belt 326 as it leaves the idler roller 328. The idler roller 328 is rotatably mounted on the under side of the top plate portion of the base 30 with the upper portion of the periphery of the roller extending through an aperture in the top plate portion of the base 30 arranged in a position so the endless conveyor belt 326 as it leaves the upper peripheral portion of the idler roller 328 will extend into the right end of the conveyor supporting track 324.

The conveyor supporting track 324 extends in substantially horizontal relation and supports the upper flight of the conveyor belt 326 in substantially horizontal relation to convey tubes 2 discharged from the operating position outwardly from the left end of the base 30 under both the horizontal and vertical cutter and punching assemblies and the crimper assembly for delivering the tubes into the swager hopper hereinafter described, see FIG. 5A. An inclined guide plate 330, FIGS. 5C and 6, is mounted under the inner end of the tip holder 240 on the upper portion of the base 30 for guiding the tip end of a tube 2 downwardly and to the left onto the conveyor belt 326.

A framework 332 formed of a plurality of horizontal and vertical frame bars is attached to the left hand end of the base 30 and extends in longitudinal relation to the left thereof beyond the end of the base and beyond the end of the supporting frame 276 and supporting post 284 of the crimper assembly, as shown in FIG. 5B. This framework provides a support for detachably mounting the central portion of the conveyor supporting track 324 in substantially horizontal position. An idler roller is supported in this framework below the conveyor supporting track 324 on the supporting member 334. The idler roller on the supporting member 334 supports a portion of the return flight of the conveyor belt 326 so it may extend downwardly to the lower portion of the base 30, through the open bottom portion of the base 30 over additional idler rollers and then upwardly to the idler roller 328 from which the endless conveyor belt extends into the upper flight for conveying the tubes from the right end to the left end portion of the conveyor supporting track 324.

The left hand portion of the conveyor supporting track 324 is secured to upwardly extending frame bars 336 of the swager frame. The endless conveyor belt 326 extends about the conveyor drive pulley 338 carried on the driven shaft of the belt drive gear box 340 mounted on the supporting plate 342. The supporting plate 342 is carried by the swager frame. The left end of the upper flight or conveyor portion of the endless conveyor belt 326 is engaged about the drive pulley 338 as it leaves the conveyor supporting track 324 for driving the conveyor belt continuously during the operation of the belt drive gear box 340. The return flight of the conveyor belt extends from the lower inner periphery of the conveyor drive pulley 338 to an idler pulley 344. The idler pulley 334 is rotatably mounted on a shaft carried by bearings secured to the upwardly extending frame bars 336 of the swager frame so that the return flight of the conveyor belt 326 will extend from the idler pulley 344 in parallel relation to and below the top or conveyor flight of the conveyor belt 326 to the idler pulley mounted on the supporting shaft 334 in the framework 332.

A supporting track 346 is secured to the under side of the supporting track 324 and extends from a position below the supporting track 324 adjacent the idler pulley 334 to a position terminating adjacent the idler pulley on the shaft 334 carried by the framework 332. This encloses the return flight of the endless conveyor belt as it passes from the conveyor drive pulley 338 until it reaches the framework 332 so that this portion of the return flight of the conveyor belt is protected against damage while it passes along the swager frame.

At the left hand end of the swager frame a belt drive motor 348 is mounted on the swager frame below the supporting plate 342 and has a belt drive pulley 350 mounted on the left hand end of its armature shaft carrying an endless belt 352 engaged over the driven pulley 354 carried by the drive shaft for the belt drive gear box 340. The motor operates the gears in the belt drive gear box 340 through operation of the belt 352 to operate the drive gears in the gear box 340 to drive the conveyor drive pulley 338 for continuously driving the endless belt 326 for conveying tubes discharged from the operating position below the feed hopper to the left end of the machine for delivery to the swager hopper.

*The swager hopper and feed assembly*

The swager hopper has a right swager hopper plate 356 and a left swager hopper plate 358 mounted in spaced parallel transversely extending relation to and extending rearwardly from the conveyor support track 324. The swager hopper and feed assembly construction is shown in FIGS. 5A and 28 to 35. The left swager hopper plate 358 has a bottom formed with a supporting and attaching flange having the bottom face engaged with a pair of substantially parallel longitudinally extending frame bars 360 forming part of the swager frame. These frame bars 360 are located in a horizontal plane substantially below that of the conveyor supporting track 324, as shown for example in FIG. 28.

Figure 28:
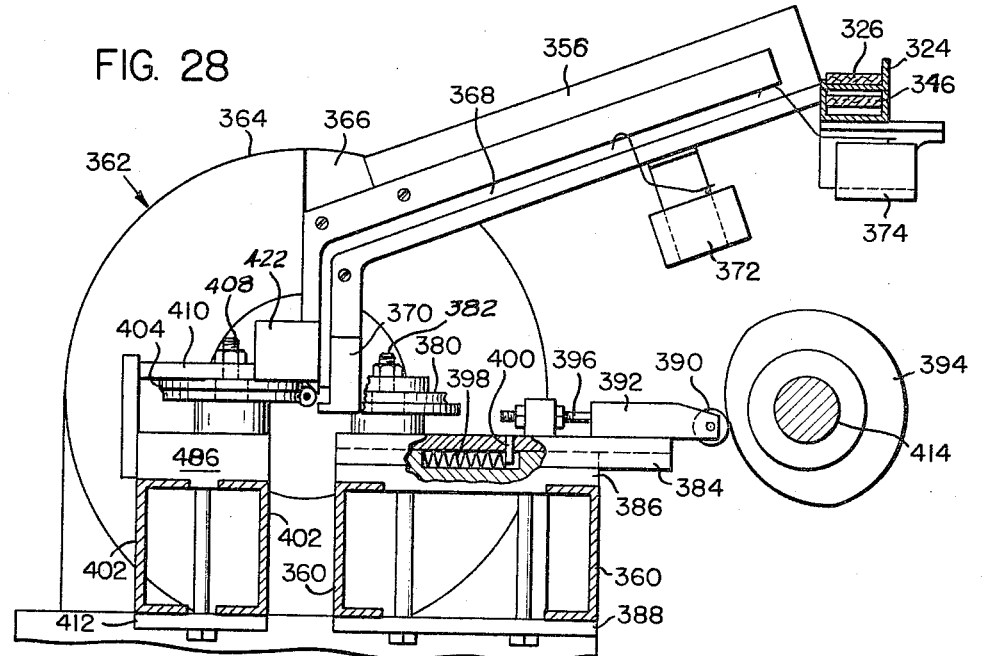
FIG. 28 is a vertical cross-section taken approximately on line 28—28 of FIG. 5A.

The left swager hopper plate 358 is adjustably mounted on the longitudinally extending frame bars 360 of the swager frame for adjustment toward and from the right swager hopper plate 356 to accommodate the length of tubing being processed in the machine. The swager unit 362 has the housing 364 modified according to the present invention by the formation of a cut-out section 366 in the left end wall thereof which receives and mounts the rear end portion of the right swager hopper plate 356, as shown in FIG. 28. The front end of the right swager hopper plate 356 extends upwardly in inclined relation and has the lower front end portion engaging the rear edge of the conveyor supporting track 324.

The inner face of the right swager hopper plate 356 is formed with an inclined guideway 368 open at the upper front end so that the tubes conveyed on the endless conveyor belt 326 may roll off of the conveyor belt to the rear and have the tip carrying end engage in the open end of the guideway 368 in the right swager hopper plate 356. The guideway 368 inclines downwardly and rearwardly to the lower rear end portion where it merges into a vertically extending portion opening through the lower end of the swager hopper plate. The lower end of the right swager hopper plate 356 terminates in substantially tangential relation with the tube receiving aperture in the swager 362, as shown in FIG. 28. A tube guide block 370 is mounted on the lower forward margin at the rear end of the right swager hopper plate 356. The guide block 370 is mounted on the inner face of the hopper plate 356 with the rear face coincident with the front edge of the vertical portion of the guideway 368 and the lower end extending below the lower end of the right swager hopper plate 356. The lower end of the guide block 370 has a rearwardly extending finger spaced below the lower open rear end of the guideway 368 for supporting the tip end of a tube 2 with the tip engaged therein in a substantially horizontal plane in front of the tube receiving opening in the swager 362.

The primary hopper feed control switch 372 is mounted on the lower side of the right swager hopper plate 356 in a predetermined position spaced rearwardly and downwardly from the upper end of the hopper plate where the tubes enter the guideway 368. A secondary hopper feed control switch 374 is mounted on the bottom of the conveyor supporting track 324 adjacent the upper front end of the right swager hopper plate 356. The primary and secondary hopper feed control switches 372 and 374 each have switch operating arms extending along the inner face of the right swager hopper plate 356 in spaced relation therefrom with the end portions extending across the horizontal plane of the guideway 368 so that a tube entering the swager hopper will have the tip end thereof in rolling and sliding down the guideway 368 operate both switches to close the circuits controlled thereby in a manner as hereinafter described.

The portion of the right swager hopper plate 356 below the guideway 368 at the upper front end portion thereof is formed to extend inwardly to provide a relatively wide supporting flange for the tubes as they enter the upper front end of the swager hopper.

Figure 34:
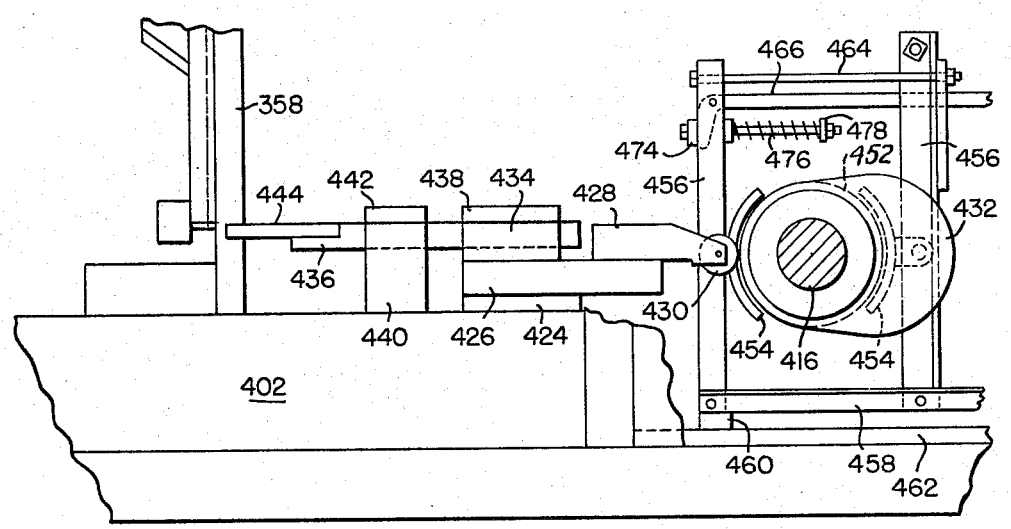
FIG. 34 is a rear elevation of the pusher.
Figure 33:
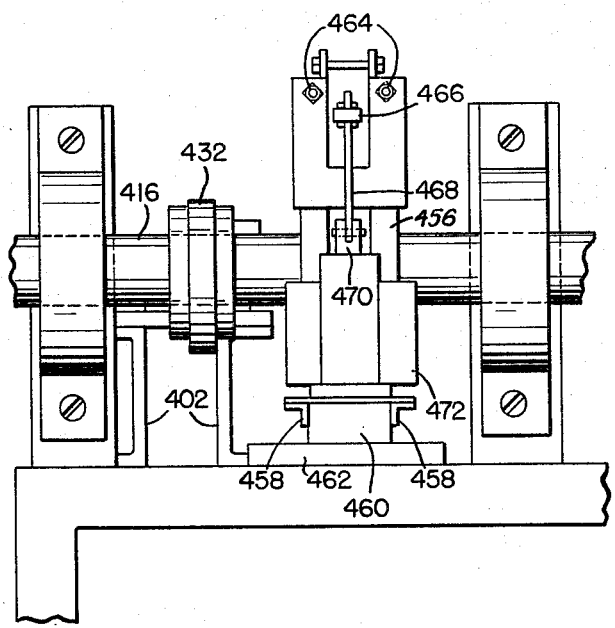
FIG. 33 is an end elevation of the pusher and brake assembly looking from the left hand side of FIG. 32.

The left swager hopper plate 358 extends forwardly and upwardly in inclined relation with the front lower end portion engaged with the rear face of the conveyor supporting track 324 in the same manner as the right swager hopper plate. The left swager hopper plate 358 has a guideway 376 extending from the upper front end rearwardly and downwardly in inclined complementary relation to the guideway 368 in the right swager hopper plate 356 with the lower rear end formed into a vertical extending guideway portion complementary to the vertical portion of the guideway 368. The lower end of the vertical portion of the guideway 376 at the rear end of the left swager hopper plate 358 opens through the lower rear end of the hopper plate. The hopper plate at the forward side of the lower vertical portion of the guideway 376 extends downwardly below the rear end of the hopper plate, as shown in FIG. 34. The left swager hopper plate has the guideway 376 in the adjacent portion of the hopper plate formed in opposite and complementary relation to the corresponding portions of the guideway 368 in the right swager hopper plate 356.

The rear upwardly extending flange on the conveyor supporting track 324 from a position alined with the right swager hopper plate 356 to the position where the left swager hopper plate 358 is adjusted, has the upper portion of the frame cut away to a point slightly below the upper face of the conveyor belt 326 in order that the tubes 2 may roll and slide off the conveyor belt when they reach the open upper end of the swager hopper between the right and left swager hopper plates. The upper front end portion at the left hand side of the left swager hopper plate 358 is formed with a tube deflector arm 378. This tube deflector arm 378 extends forwardly over the conveyor belt 326 to the forward edge of the conveyor supporting track 324 and curves toward the right swager hopper plate 356 in the manner shown in FIG. 5A for causing the left end of a tube traveling on the conveyor belt 326 to be deflected into the hopper guideway 376. This deflecting action on a tube 2 will also cause the tube to roll so that the tip end of the tube will move into the open end of the guideway 368 in the right swager hopper plate 356.

The portion of the left swager hopper plate 358 below the guideway 376 is formed with an inwardly extending flange extending from the forward upper end thereof downwardly to the rear end portion thereof. These inwardly extending flanges on the swager hopper plates extending toward each other provide a support for the tubes 2 as they leave the conveyor belt 326 so they will roll downwardly and rearwardly in the inclined complementary guideways 368 and 376 into the vertical portions of the guideways at the rear of the swager hopper and down to the lower ends thereof. The tubes will be stopped at the lower ends of these guideways in a manner that will be hereinafter described.

The swager feed roll assembly is shown in FIGS. 5A and 28 to 31 inclusive. The spaced longitudinally extending frame bars 360 of the swager frame support a pair of slidable feed rolls in spaced parallel relation between the right and left swager hopper plates 356 and 358 respectively. The description of one of these feed rolls and its mounting structure will be sufficient for both as they are duplicates.

A movable feed roll 380 is rotatably mounted on a vertical stud 382 on top of swager feed slide bar 384 at the rear end portion thereof so the marginal portion of the feed roll 380 will project beyond the rear end of the swager feed slide bar 384. This swager feed bar 384 is formed with a dovetail groove slidably receiving a dovetailed rib on a supporting plate 386 which slidably mounts the slide bar 384 for forward and rearward sliding movement thereon. The supporting plate 386 for the swager feed slide bar 384 has a lower face at opposite ends thereof mounted on the upper surface of the spaced longitudinally extending frame bars 360 to which is is rigidly secured by means of a pair of bolts extending through a retainer plate 388 engaged at opposite ends with the lower faces of the bars 360 of the swager frame.

The lower face at opposite ends of the supporting plate 386 is notched out to provide shoulders for engaging the inner edges of the supporting bars 360 to rigidly hold the supporting plate 386 against endwise movement relative to the bars 360. It will be understood that by loosening the bolts extending through the retainer plate 388 that each movable feed roll 380 and its slide bar 384 may be adjusted longitudinally along the supporting bars 360 so that the pair of feed rolls may be positioned at the desired points on the bars 360 between the swager hopper feed plates and relative to each other for feeding a tube 2.

A cam follower roller 390 is rotatably mounted in the bifurcated front end of the follower roller supporting plate 392 which is adjustably mounted on the top face of the swager feed slide bar 384 for adjustment of the slide bar movement by the operating cam 394. A threaded rod 396 has one end rigidly attached to the rear end of the follower roller supporting plate 392 in the central portion thereof and the opposite end extending through an upwardly extending block portion on the swager feed slide bar 384. A pair of nuts threaded on the threaded rod 396 for engaging opposite sides of the upwardly extending block portion will retain the follower roller supporting plate 392 in adjusted position on the swager feed slide bar 384. The operating cam 394 is formed to move the slide bar 384 in the feeding operation of a tube.

The slide bar 384 is moved forwardly by a pair of compression springs 398 mounted in a recess on the under side of the slide bar 384 and a complementary recess formed in the dovetailed portion of the supporting plate 386. The slide bar 384 has a plate mounted on the under side of the slide bar in the recess at the forward end thereof extending downwardly into the recess in the supporting plate 386 with the compression springs 398 engaged with the rear face of this plate for normally moving the slide bar 384 forwardly to retain the cam follower roller 390 in engagement with the periphery of the cam 394. The rear ends of the compression springs engage the wall of the supporting plate 386 at the rear end of the recess so that the compression springs normally move the swager feed slide bar 384 forwardly for keeping the cam follower roller 390 against the operating cam 394.

A pair of spaced parallel frame bars 402 extending longitudinally of the swager frame rearwardly of the spaced longitudinally extending frame bars 360 are parallel to the bars 360 and lie in the same horizontal plane therewith. A pair of stationary swager feed rollers 404 are mounted on a feed roller supporting block 406 for rotation on a vertically extending stud 408 mounted in the block 406 at the lower end and having the upper end extending through the supporting bracket 410 carried by the rear side of the feed roller supporting block 406. This supplies a rigid support for the stationary feed roller 404 so that a tube may be forced into peripheral engagement therewith by the movable feed rollers 380 for firmly holding a tube engaged between the peripheries of a movable feed roller 380 and a stationary feed roller 404. The feed roller supporting block 406 is mounted on the top faces of the spaced parallel frame bars 402 of the swager frame with the bottom faces notched out to receive the upper portions of the bars and provide shoulders engaging the inner edges of the bars to retain the feed roller supporting block against forward or rearward movement. A bolt extending through a retainer plate 412 threaded into the bottom portion of the supporting block 406 rigidly retains the supporting block 406 in adjusted position on the spaced parallel frame bars 402. Each of the stationary swager feed rollers 404 are constructed and mounted in the same manner so that the description of one will suffice for describing both.

The stationary feed roller 404 has the lower end formed with a partially circular groove extending about the periphery of the roller. This groove in feed roller 404 is alined with a complementary partially circular groove in the periphery at the upper end of a movable feed roller 380 in horizontal relation. The lower end of the feed roller 380 extends beyond the peripheral grooved portion in the upper end to form an annular tube supporting flange 381 for supporting a tube 2 in alined relation with the peripheral grooves in the feed rollers 380 and 404. The tube receiving grooves in the lower ends of the pair of stationary feed rollers 404 have the curved portions of the grooves therein arranged to have the center for the curvature of the grooved portion alined with the tube receiving opening in the swager in substantially coaxial relation.

The operating cams 394 for the pair of movable swager feed rolls 380 are constructed so that the feed rolls 380 are positioned in the forward open position with the grooved upper end portions positioned in advance of the lower forward portions of the vertical guideway sections of the guideways 368 and 376 in the right and left swager feed hopper plates 356 and 358 respectively. In this position of the pair of movable swager feed rolls 380, umbrella tubes 2 moving in the vertical rear portions of the guideways in the swager hopper plates will move downwardly in the rear of the peripheral grooved portions in the movable feed rollers 380 and engage the upper face of the tube supporting flanges 381. The lowermost tube 2 will move out from the lower ends of the guideways in the swager hopper plates and be supported on the flange 381 of the movable feed rollers 380. The remaining umbrella tubes 2 in the swager feed hopper will be supported in the guideways by the lowermost tube 2. The finger on the lower end of the guide block 370 at the lower rear portion of the right swager hopper plate 356 will cooperate with the tube supporting flanges 381 by supporting the tip end of the tube adjacent to the swager 362.

The adjustment of the follower roller supporting plate 392 on the swager feed slide bar 384 for each movable swager feed roller 380 is provided so the slide bar 384 can be adjusted to locate the grooved upper end portions of the feed rollers 380 slightly forward of the lower rear ends of the guideways in the swager feed hopper for receiving and supporting a tube 2 in a manner above described.

The swager frame is provided with spaced bearings for rotatably mounting the cam shaft 414 on which the operating cams 394 for the movable swager feed rollers 380 are mounted. This swager feed cam shaft 414 extends longitudinally of the swager frame at the front portion thereof under the conveyor supporting track 324. A beveled gear connection is provided at the left hand end of cam shaft 414, as shown in FIG. 5A with the driven shaft 416 rotatably mounted in a pair of spaced bearings mounted on the rear portion of the swager supporting frame.

Figure 36:
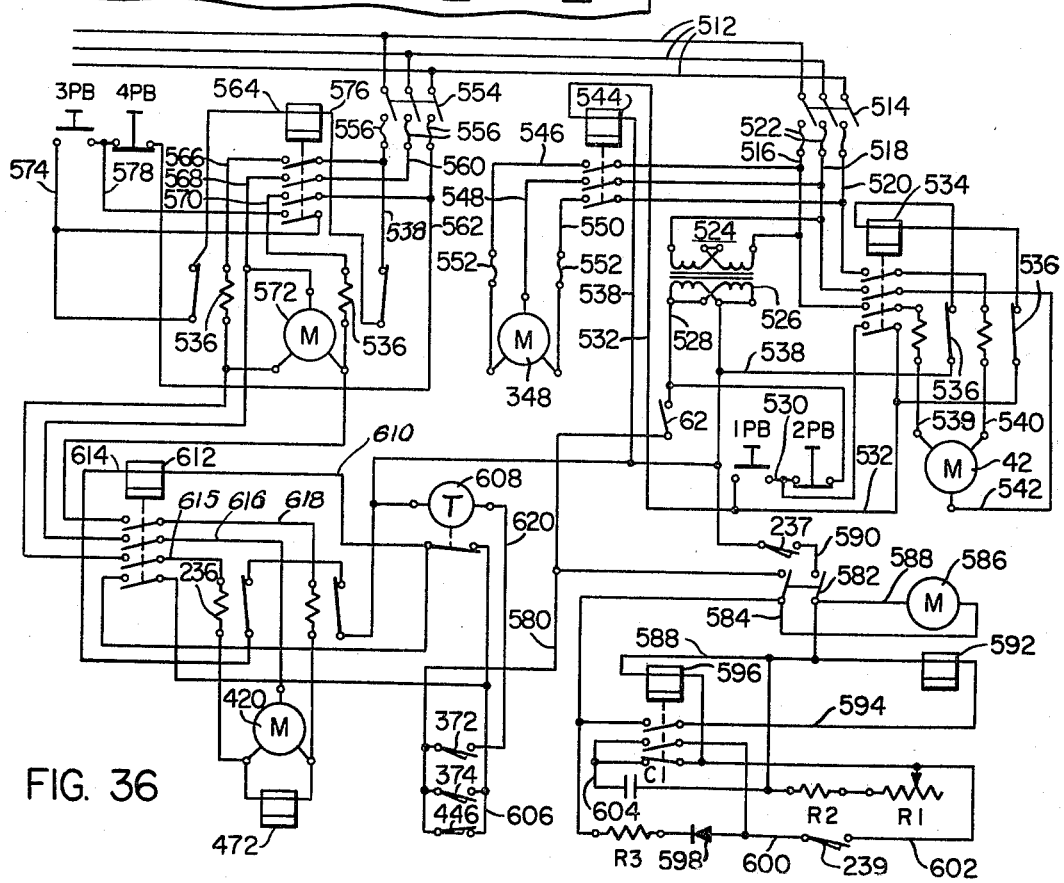
FIG. 36 is a wiring diagram showing the electrical connections to the several motors, relays and other controls for automatically controlling operation of the machine.
Figure 32:
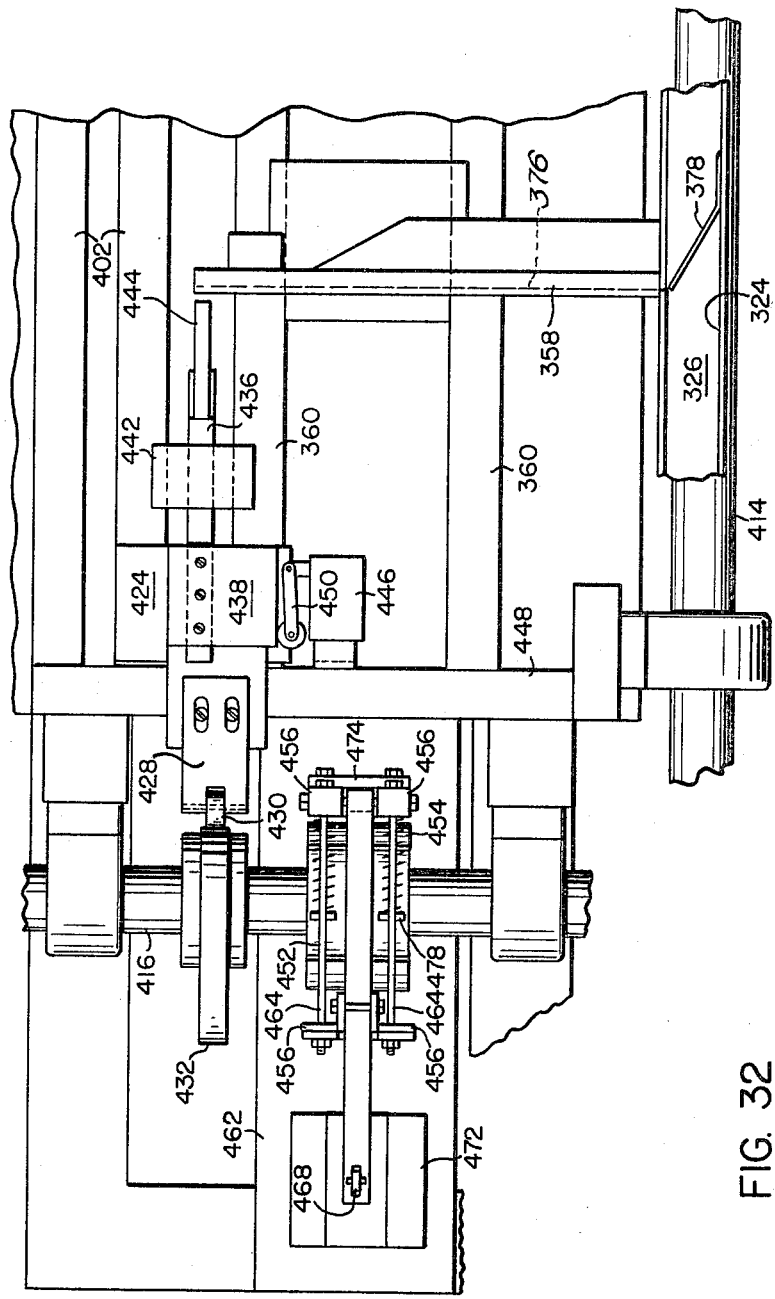
FIG. 32 is an enlarged plan view showing the left portion of the swager feed hopper and the swager pusher and brake assembly.

The rear end of the driven shaft 416 carries a pulley 418 for mounting a plurality of drive belts which extend downwardly and engage over a drive pulley on the armature shaft of a swager feed drive motor 420, FIG. 36. This swager feed drive motor 420 is a suitable conventional form of electric motor mounted on the lower left hand end portion of the swager frame. This swager feed drive motor 420 may include a gear reduction unit in addition to the motor driving the pulley 418 and the driven shaft 416 at the desired speed. This swager feed drive motor 420 and the drive connections with the driven shaft 416 are of a conventional character well known in the art in use for the purpose of providing a separate source of power for driving the swager feed mechanism independently of the previously described tube forming mechanism mounted on the base 30.

When a tube 2 is supported on the tube supporting flanges 381 of the movable feed rollers 380 at the lower ends of the guideways in the swager feed hopper, it is retained in engagement with the upper faces of the tube supporting flanges 381 by a pair of spring pressed latches 422 mounted on the supporting brackets 410 of the stationary swager feed rollers 404. These spring pressed latches 422 are of substantially duplicate construction to the latches hereinabove described and shown in FIG. 14. The lower portions of the spring pressed latches 116 extend below the bottom of the latch casings at the forward lower end thereof so the latches in the two latch members 422 will project in the rear of the tube supported on the tube supporting flanges 381 of the movable swager feed rollers 380 for retaining the tube in position thereon.

Figure 5A:
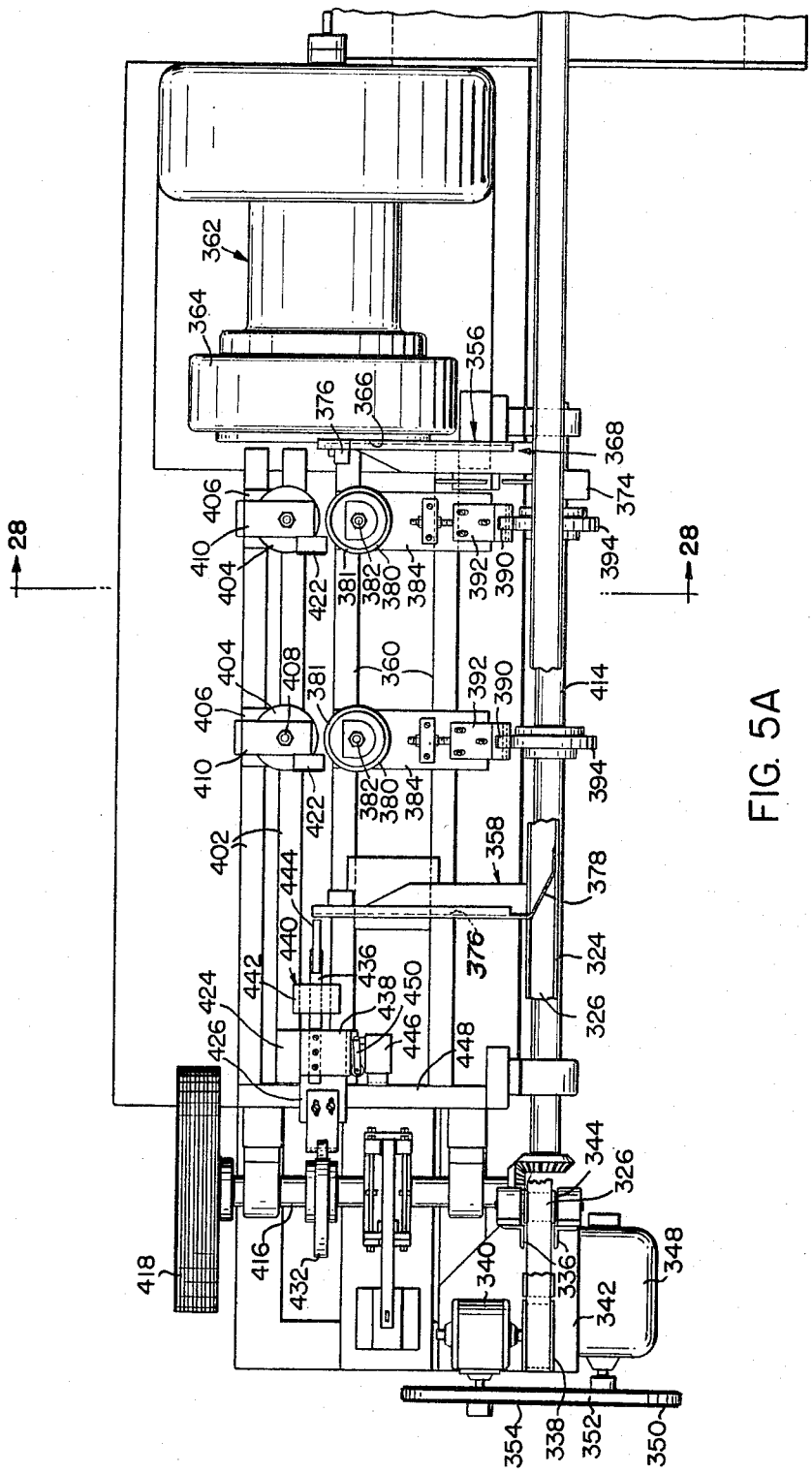
FIGS. 5A, 5B and 5C show a plan view of the automatic umbrella tube making machine embodying the present invention.
Figure 5B:
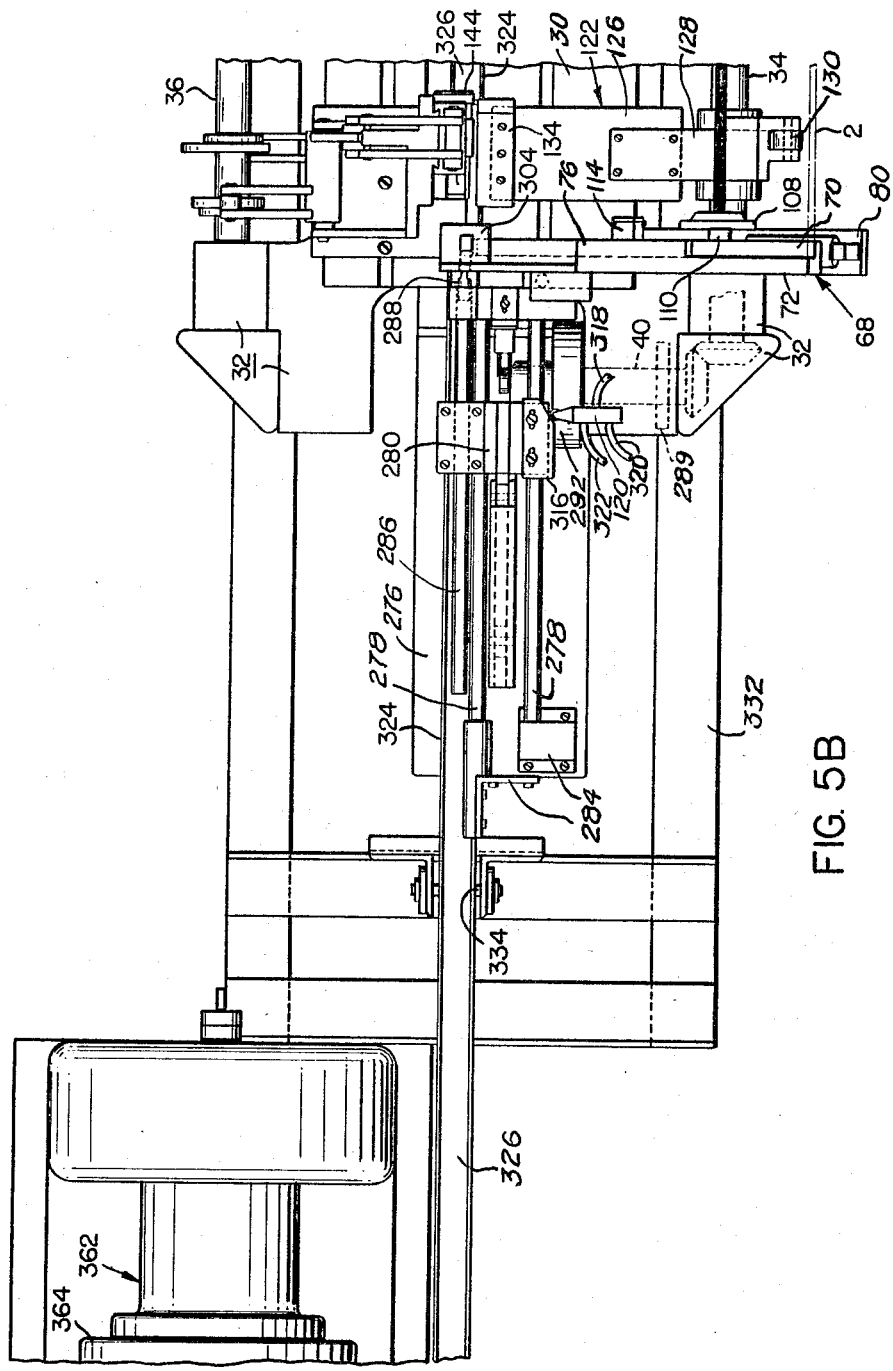
Figure 5C:
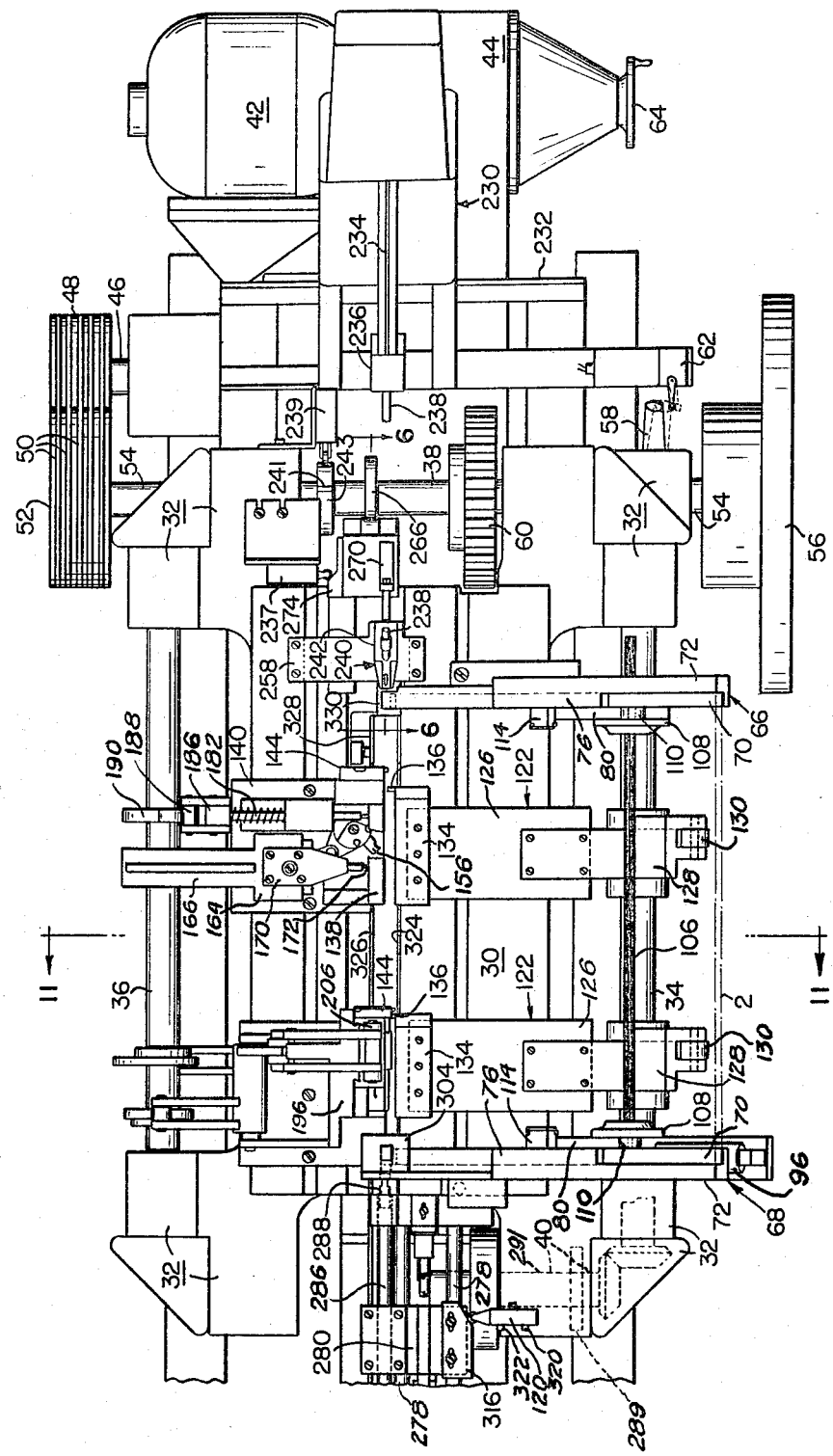
Figure 6:
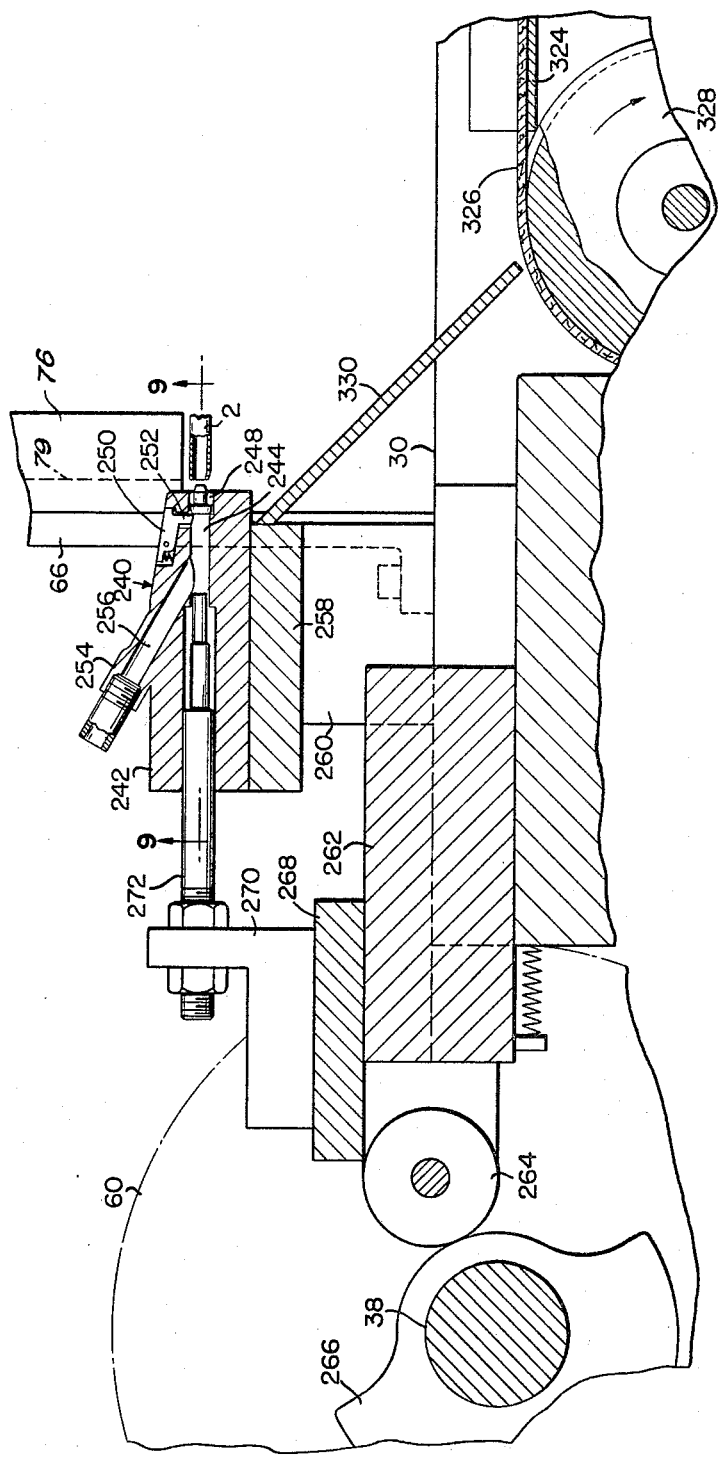
FIG. 6 is an enlarged vertical longitudinal cross-section of a tip holder assembly taken approximately on line 6—6 of FIG. 5C.

The swager pusher assembly has a base plate 424 that is detachably mounted on the top faces of the rear longitudinally extending frame bar 360 and the adjacent front parallel frame bar 402 of the swager frame at the left end thereof and to the left of the left swager hopper plate 358, see FIG. 5A. The swager pusher and brake assemblies are shown in FIGS. 5A and 32 to 34 inclusive. A pusher slide 426 is slidably mounted on the base plate 424 by an interengaged dovetail connection. The pusher slide 426 is slidable longitudinally of the swager frame in alined relation with the swager and the feed rolls 380 and 404.

The left hand end of the swager pusher slide 426 detachably and adjustably mounts a follower roller supporting plate 428 carrying a follower roller 430 in the outer bifurcated end thereof engaged with the periphery of the pusher operating cam 432. The pusher operating cam 432 is mounted on the driven shaft 416 in longitudinally alined relation with the pusher slide 426. The pusher slide 426 and the base plate 424 are formed with recesses in the contacting surfaces for receiving a pair of compression springs for operating the pusher slide to the left on the base plate 424 to maintain the follower roller 430 in engagement with the periphery of the operating cam 432. The construction of the base plate 424 and the pusher slide 426 is substantially the same as that described in connection with the mounting of the compression springs 398 between the supporting plate 386 and the swager feed slide bar 384 hereinbefore described.

The inner end of the pusher slide 426 is formed with a holder 434 for detachably and adjustably receiving one end of the pusher bar 436 retained in the holder 434 by the pusher bar retaining plate 438. The inner end of the pusher bar 436 is slidably mounted in the pusher bar guide block 440 having the bottom portion mounted on the top portions of the rear longitudinally extending frame bar 360 and the adjacent front parallel frame bar 402 and the upper end slotted to receive the pusher bar 436 for retention by the cover plate 442.

A tube engaging tip 444 is detachably mounted on the inner terminal portion of the pusher bar 436 with the free end positioned to engage the handle end of a tube 2 when it is moved into the position against the grooved portions of the stationary feed rollers 404 so that movement of the pusher bar 436 by the operation of the cam 432 will push a tube 2 held between the feed rollers 380 and 404 into the swager for the swaging operation on the tip end.

A swager feed control switch 446 is mounted on a bracket carried by the transverse frame bar 448 connecting the outer ends of the frame bars 360 and 402 forming parts of the swager frame. The swager feed control switch 446 has an operating arm 450 pivoted thereon at one end and carrying a roller on the opposite end for engagement with a cam block mounted on the adjacent side of the holder 434 of the pusher slide 426 for operating the operating arm 450 and opening and closing the switch during the reciprocating movement of the pusher slide 426. This switch controls the operation of the swager feed drive motor 420 for stopping the operation of the swager feed mechanism with the pusher bar 436 in the return position.

An electrically operated brake is provided to stop the rotation of the driven shaft 416 and the swager feed cam shaft 414 as soon as the circuit to the swager feed drive motor 420 is opened. This brake mechanism has a brake drum 452 mounted on the driven shaft 416 in adjacent but spaced relation to the pusher operating cam 432. A pair of brake shoes 454 are mounted at opposite sides of the brake drum 452 and driven shaft 416 on pairs of upright brake shoe supporting levers 456 in the intermediate portions thereof while the lower ends of the levers 456 are pivotly mounted in the horizontal supporting arms 458. The horizontal supporting arms 458 are pivotly mounted on the brake supporting block 460 carried by the supporting plate 462 at the upper left end of the swager frame in outwardly projecting relation beyond the transverse frame bar 448. The upper ends of the brake shoe supporting arms 456 are connected by a pair of adjusting bolts 464 for adjusting the position of the brake shoes 454 relative to the brake drum 452.

This brake construction is of conventional form well known in the art and a specific description of all the details of construction and operation are not believed necessary. A brake operating lever 466 has a substantially horizontal arm portion pivoted at one end between the pair of upright brake shoe supporting levers 456 extending upwardly from the brake supporting block 460, has the other end extending between the other pair of brake shoe supporting levers 456 and extends outwardly therefrom with the free end detachably connected with one end of a link 468. The other end of the link 468 is pivotally connected with the armature 470 of the brake operating solenoid 472.

The brake operating lever 466 has an operating arm extending downwardly from the portion pivoted between the arms 456 for engagement with an operating plate 474 having opposite ends mounted on supporting rods 476 slidably engaged in apertures in the pair of upright brake shoe supporting levers 456 carrying the brake operating lever 466. The opposite ends of the supporting rods 476 extend toward the opposite pair of levers 456 over the brake drum 452 and support compression springs thereon between adjustable spring retaining caps 478 on the sides of the pair of levers 456 opposite to the operating plate 474.

The springs 476 will normally retain the operating plate 474 against the levers 456 and move the outer end of the operating lever 466 pivotly connected with the link 468 upwardly with the armature 470 when the solenoid 472 is deenergized for operating the brake shoe supporting levers 456 to engage the brake shoes 454 with the brake drum 452 and stop rotation of the driven shaft 416. Whenever the solenoid 472 is energized it pulls the armature 470 downwardly with the outer free end of the operating lever 466 so that the downwardly projecting arm on the operating lever 466 will engage and move the operating plate 474 away from the arms 456 to compress the springs 476 and move the brake shoes 454 into disengaged relation from the brake drum 452.

This brake mechanism immediately stops rotation of the driven shaft 416 to stop operation of the swager feed mechanism and the pusher bar 436 when it is in the retracted or return position.

*The swager*

The swager 362 is of conventional construction well known in the art and made by Abbey Etna Machine Co., of Perrysburg, Ohio. An enlarged rear side elevation of the swager is shown in FIG. 35 with parts broken away and shown in cross section to illustrate some of the details of construction of the swager including the modification thereof according to the present invention.

The swager 362 has a casing 364 mounted on the inner or right hand end of the swager frame on the supporting plate 480 forming a portion of the swager frame at the right hand end thereof. The swager casing 364 rotatably mounts a tubular swager drive shaft 482 carrying a pulley 484 at the outer end rotated by a plurality of endless belts driven by the swager drive motor and pulley on the armature shaft thereof, not shown, for rotating the swager shaft 482 in the operation of the swager mechanism. The inner end of the swager carries a swager head 486 carrying the swager rolls 488 for operating the swager dies 490 in performing a swaging operation. The inner ends of the swager dies 490 are formed to provide the substantially conical or tapered end portion on the tip end of an umbrella tube 2, as shown in FIGS. 1 and 2. The swager has a guide block 492 formed with a guide passage 494 flared outwardly at the open end for guiding the tip end of a tube 2 into the swager for the swaging operation thereon.

The swager is modified by having a stop rod 496 adjustably mounted in a supporting bracket 498 secured to the outer end of the tubular swager drive shaft 482 projecting beyond the pulley 484. The stop rod 496 carries a spacer collar 500 on the inner end portion thereof slidably engaged in the tubular shaft 482 for supporting the inner end of the stop rod 496 in substantially coaxial relation in the swager drive shaft 482. The inner terminal portion of the stop rod 496 slidably mounts a holding sleeve 502 housing a compression spring 504 between the inner end of the sleeve 502 and the terminal of the stop rod 496.

A transverse pin 506 mounted in the inner end of the holding sleeve 502 extends through a longitudinal slot 508 in the stop rod 496 for limiting movement of the holding sleeve 502 mounted on the stop rod 496 with the compression spring 504 normally projecting the outer end of the holding sleeve 502 toward the swager dies 490. The outer end of the holding sleeve 502 carries a tip engaging pin 510 in substantially coaxial relation with the swager drive shaft 482, the swager head 486 and the swager dies 490. This tip engaging pin 510 projects in substantially coaxial relation through the swager dies 490 to the outer side thereof and the inner end of the guide passage 494. A tube 2 with its top 6 mounted in the tip end thereof when pushed through the guide passage 494 for the swaging operation will have the end of the tip 6 contact the end of the tip engaging pin 500 before entering the rotating swaging dies 490 so the pin 500 will hold the tip 6 constantly engaged with the end of the umbrella tube 2 during the entire swaging operation.

When the swager feed drive motor 420 is running for operating the feeder and the pusher mechanism, an umbrella tube 2 with the tip 6 engaged in the right hand end thereof and held by the dimple as shown in FIGS. 3 and 4 will be fed from the swager hopper onto the tube supporting flanges 381 of the movable feed rolls 380. The operating cams 394 will move the movable feed rolls 380 toward the stationary feed rolls 404 to move the tube carried thereby to push the spring pressed latches in the latch members 422 rearwardly and upwardly until the tube disengages the latches 116 of these latch members and moves into engagement with the curved peripheral portions of the stationary feed rollers 404.

While a tube 2 is firmly held by the feed rollers 380 and 404 in coaxial relation with the passage 494 in the swager 362, the operating cam 432 will move the pusher bar 436 to engage the tube engaging tip 444 with the handle end of the tube 2 held by the feed rollers and move the tip supporting end into the passage 494 of the swager. This operation will be continued through the pusher bar 436 pushing the tip 6 and the adjacent end portion of a tube carrying the tip through the passage 494 in the guide block 492 of the swager to engage the tip and the adjacent portion of the tube 2 between the swager dies 490. The swager dies 490 swage the end of the tube 2 about the shank of the tip 6 to form it inwardly to engage the shank of the tip and provide a tapered end portion extending from the head of the tip and gradually enlarging until the swaged portion spaced from the tip merges into the outer wall of the tube.

The pusher bar 436 in pushing the tip end of the tube into the swager dies 490 will move the tip end of the tube into the swager dies a distance equal to the length of the tapered portion on the tube plus the tip. During this inward movement the tube is swaged into the tapered shape and at the same time the tip engaging pin 510 holds the tip 6 engaged with the end of the tube 2 while it is being swaged and exerts pressure through the spring 504 as the tube is moved inwardly in the swager. The tip engaging pin 510 and the holding sleeve 502 will be moved by the tube 2 and the tip thereon to compress the spring 504 until the holding sleeve 502 reaches its inner limit of movement at the time when the pusher bar 436 has been moved toward the swager 362 by the pusher operating cam 432 to the maximum extent of its movement.

The pusher bar 436 will be withdrawn to its return position as the pusher operating cam 432 completes one revolution of the cam by the compression springs operating the holder 434 to maintain the follower roller 430 in engagement with the periphery of the operating cam 432. At the same time the compression spring 504 will push the swaged end of the umbrella rod 2 with its tip firmly engaged therein by the swaging operation outwardly from the swaging dies 490.

This operation by the compression spring 504 pushing the umbrella tube 2 out of the swaging dies 490 is sufficient to push it outwardly from the guide block 492 through the passage 494 whereupon the finished tube will be discharged from the swager feed mechanism by the movable feed rolls being operated from the position where they hold the tube against the stationary feed rolls 404 toward the return position. As the feed rolls 380 are moved toward the return position the back sides of the latches 116 of the latch members 422 will hold the finished tube 2 so that it will be moved off of the tube supporting flanges 381 of the feed rollers 380 after which the finished tube will disengage the feed rollers 380 and 404 and drop out of the swager feed mechanism into a suitable box, not shown, for receiving finished umbrella tubes.

*Operation and wiring diagram*

A suitable source of electrical power supply from the usual commercial electrical supply lines will have a three-wire supply circuit indicated by numeral 512 in the wiring diagram FIG. 36 extended into the vicinity of the machine for supplying the electric current for operating the several motors and controls. For example, an electric supply of 60 cycle, 3-phase 440 volts alternating current may be used for the operation of the machine. The main switch 514 is manually operable to close a circuit to the wires 516, 518 and 520 through suitable fuses 522. A transformer 524 has opposite terminals of the primary connected to the wires 516 and 518. The secondary 526 of the transformer 524 has a wire 528 connecting one terminal thereof with the one terminal of the push-button 2PB. The other terminal of the push-button 2PB is connected by the wire 530 to one terminal of the push-button 1PB having the other terminal connected by the wire 532 to one side of the magnet of the main drive motor control relay 534 through a resistance type overload control relay 536. The other terminal of the magnet of the main drive motor control relay 534 is connected by a wire 538 through another resistance-type overload control relay 536 to the other terminal of the secondary 526 of the transformer 524.

The push-button 1PB is normally open and is manually operable to close the circuit to the main drive motor control relay magnet 534 through the wire connections above described for energizing the magnet to close the four normally open relay contacts. This closes the circuits through the first three contacts of the main motor control relay 534 for connecting the main drive motor 42 to the power supplied through the wires 516, 518 and 520 respectively, by wire connections 539, 540 and 542 respectively. The wires 539 and 540 include the resistance elements of the resistance-type overload control relays 536 in the circuit to the motor 42. These resistance-type overload control relays 536 are usually built into the motor construction and are of a conventional form adapted to open the circuit to the motor in the event of an overload on the motor.

The fourth normally open contact of the main drive motor control relay 534 has the wires 530 and 532 connected to opposite terminals thereof for placing it in circuit in parallel with the push-button 1PB to close the circuit when the magnet of the main drive motor control relay 534 is energized for maintaining this circuit closed to obtain continuous operation of the main drive motor 42 until the motor is stopped through the operation of the motor stop push-button 2PB to open the circuit to the magnet of the motor control relay 534.

The wire 532 is also connected to one terminal of the magnet of the conveyor motor control relay 544 while the opposite terminal of the relay magnet has the wire 538 connected thereto so that this magnet is connected in circuit in parallel with the relay magnet of the main drive motor control relay 534. When this conveyor motor control relay 544 has the magnet energized it will close the three normally open contacts to close the circuit to the main power of supply through the wires 516, 518 and 520 respectively, to the wires 546, 548 and 550 respectively connected to the terminals of the conveyor motor 348 for supplying the current to operate this motor from the main supply. Suitable fuses 552 are connected in circuit in wires 548 and 550 respectively, as shown in FIG. 37.

Another main switch 554 connects the main power lines 512 through suitable fuses 556 with the wires 558, 560 and 562 respectively connected to one terminal of the first three normally open contacts of the swager motor control relay 564. The other terminals of the first three normally open contacts of the relay 564 are connected by the wires 566, 568 and 570 respectively, to the three terminals of the swager motor 572. Two resistance-type overload control relays 536 have the resistance elements thereof included in the circuit connections through the wires 566 and 570 to the swager motor 572.

The motor start push-button 3PB has a wire connection 574 from one terminal thereof through an overload control relay 536 to one terminal of the magnet of the swager motor control relay 564 while the other terminal of the magnet is connected by a wire 576 to the wire 558 through the overload control relay 536. The other terminal of the motor start push-button 3PB is connected by a wire 578 to one terminal of the motor stop push-button 4PB which has the wire 562 connected to the other terminal thereof. The swager motor control relay 564 has a fourth normally open contact connected in parallel with the motor start push-button 3PB by having the wires 574 and 578 connected to the opposite terminals thereof.

The motor start push-button 3PB is manually operated to close the circuit to the magnet of the swager motor control relay 564 for energizing this relay to start the swager motor immediately after the motor start push-button 1PB is operated to start the main drive motor and the conveyor motor. When the swager motor control relay 564 is energized it closes the fourth normally open contact for closing a stick circuit to the magnet of the relay for holding all of the contacts closed so that the swager motor will continue to operate until either the main switch is manually opened or the motor stop push-button 4PB is operated.

The machine is now ready to start the operation for feeding and forming the tubes in the manner hereinbefore described. The machine operator places a supply of tubes in the feed hopper in the upper hopper section between the right and left hopper plates 66 and 68 respectively, so that they will move downwardly through the guideways 74. The machine operator then operates the clutch lever 58 into a forward position as shown in dotted lines in FIG. 5C for engaging the clutch to start rotation of the right cam shaft 38, the front cam shaft 34, the rear cam shaft 36 and the left cam shaft 40. The movement of the clutch lever 58 into the forward position moves the switch 62 into closed position for closing the remaining control circuits on the machine.

The control switch 62 has the wire 528 connected to one terminal thereof while the opposite terminal is connected by a wire 580 to one terminal of a manual control switch 582 of the single-throw-double-pole type with the opposite terminal for the corresponding switch blade thereof connected by the wire 584 to one terminal of the tip feed motor 586. The other terminal of tip feed motor 586 is connected by wire 588 to the other switch blade terminal of the manual control switch 582 having the corresponding opposite terminal connected by the wire 590 to one terminal of the microswitch 237.

The opposite terminal of the microswitch 237 is connected to the wire 538 so that the circuit to the tip feed motor is connected to the secondary 526 of the transformer 524 for operation under control of the microswitch 237 and the manually operated control switch 582. The manually operated control switch 582 is manually closed and remains closed during the normal operation of the machine so that the tip feed motor is operated whenever the microswitch 237 is closed.

The solenoid 592 controls the feed of tips from the inclined chute 234 into the flexible tube 238 and the air discharge for moving a tip through the flexible tube 238 into position in the tip holder 240 as hereinbefore described. The wire 588 is connected to one terminal of the solenoid 592 while the other terminal is connected by a wire 594 to one terminal of the normally open first contact of the tip feed control relay 596. The other terminal of the first normally open contact of the tip feed control relay 596 has the wire 584 connected thereto. The tip feed control relay 596 controls the operation of the solenoid 592 in the feed of one tip at a time into the flexible tube 238. The solenoid 592 is energized only when the control relay 596 is energized to close the circuit through the first contact thereof.

The wire 584 is connected to one terminal of a resistor R3 having the opposite terminal connected to one terminal of the rectifier 598. The other terminal of the rectifier 598 is connected by the wire 600 to one terminal of the micro-switch 239. The opposite terminal of the microswitch 239 is connected by the wire 602 to one terminal of the magnet of the tip feed control relay 596. The other terminal of the magnet of the tip feed control relay 596 has the wire 588 connected thereto. This circuit through the rectifier 598 provides direct current for energizing the magnet of the tip feed control relay 596 when the microswitch 239 is operated to close the circuit.

The tip feed control relay 596 has three contacts controlled thereby in which the second contact is normally open and the third contact is normally closed when the magnet of the relay is de-energized. The wire 600 is connected to one terminal of the second normally open contact of the tip feed control relay 596 while the other terminal of the second contact has a wire connection 604 with one terminal of the normally closed third contact of the relay 596 and one terminal of the condenser C1. The wire 602 is connected to the other terminal of the third normally closed contact of the relay 596. The other terminal of the condenser C1 is connected to the wire 588. A resistor R2 is connected in series with a variable resistor R1 between the wires 588 and 602. When the micro-switch 239 closes to energize the magnet of the tip feed control relay 596 the discharge from the condenser C1 will be applied through the wire 604, the closed third contact of the relay 596 and the wire 602 to one terminal of magnet of the relay 596 while the other terminal is connected through the wire 588 to the opposite terminal of the condenser C1. This aids in a rapid energization of the magnet of the control relay 596 for quickly operating the contacts thereof to close the first two contacts and open the third. This secures more rapid energization of the solenoid 592 to operate the feed slide for feeding a rivet. As soon as the microswitch 239 is opened, the discharge from the condenser C1 will be absorbed in the three resistors while the first and second contacts open and the third contact closes.

The control switch 62 in controlling the circuit to the wire 580 also controls the operation of the swager feed motor. The wire 580 is connected to one terminal of each of the microswitches 372, 274 and 446. The opposite terminal of each of these three microswitches is connected by a wire 606 to one terminal of the normally open contact of the timer 608. The other terminal of the contact of the timer 608 is connected by a wire 610 with one terminal of the magnet of the swager feed control relay 612. The other terminal of the magnet of the swager feed control relay 612 is connected by the wire 614 to the normally contact of resistance type overload relay 236 having the other terminal connected in series to a second overload control relay 236 which in turn is connected to the wire 538.

The microswitch 446 is normally closed and is operated by the switch lever 450 to open the contacts whenever the pushed bar 436 is in the return position through the operation of the cam on the pusher slide 426 operating the lever 450. When the pusher slide 426 moves forwardly to push a tube into the swager 362, the microswitch 446 will close and maintain the circuit to the magnet of the swager feed control relay energized for holding the four normally open contacts in closed position to close the circuits controlled thereby.

When the magnet of the swager feed control relay 612 is energized it closes the first three contacts for closing the circuit from the wires 566, 568 and 570 respectively, to the wires 615, 616 and 618 respectively, to the three terminals of the swager feed motor 420 to operate the swager feed and pusher mechanism through rotation of the shafts 414 and 416. The circuits through the wires 615 and 618 extend through the resistor elements of the overload control relays 236.

The brake operating solenoid 472 has the opposite terminals thereof connected to the wires 615 and 618 respectively so that it will be energized while the swager feed motor is running to operate the brake-shoes to disengage them from the brake drum in the manner hereinbefore described. The fourth normally open contact of the swager feed control relay 612 closes a stick circuit between the wires 610 and 606 for normally holding the magnet of the relay 612 energized independent of the contact of the timer relay 608.

It will be understood that when the pusher slide 426 is in the return position the circuit to the swager feed control relay 612 will be held open. This circuit to the magnet of the swager feed control relay 612 will normally be held open so that the swager feed motor 420 will not operate until a supply of tubes is delivered to the swager hopper. The primary hopper feed control switch 372 which is normally open controls the starting of the swager feed motor 420 and its continued operation. It is necessary to feed a sufficient number of tubes into the swager hopper to have the bottom tubes supported on the two supporting flanges 381 of the movable feed rollers 380 with the tubes in the top portion of the swager feed hopper in a position to engage the arm of the primary hopper feed control switch 372 and hold it in closed position.

While the primary hopper feed control switch 372 is held in closed position it will close the circuit from the wire 580 through the switch 372 to the wire 620 connected with one terminal of the relay element of the timer relay 608 having the other terminal connected to the wire 538. This energizes the relay element of the timer relay 608 to close the normally open contact thereof and hold it in closed position while the timer relay is energized.

As soon as the contact of the timer relay 608 closes, it closes the circuit hereinabove described to the magnet of the swager feed control relay 612 for moving the contacts in the closed position for starting and continuing operation of the swager feed motor 420. The closed fourth contact of the energized swager feed control relay 612 will maintain the swager feed control relay 612 energized independently of the timer relay 608 as long as the switch 446 or 374 closes its contacts. This condition will operate after the relay timer 608 completes its timing operation and opens the timer contact. The secondary hopper feed control switch 374 operates in combination with the primary control switch 372 to hold the swager feed control relay 612 energized for the continued operation of the swager feed motor 420 as long as tubes 2 are fed to the swager feed hopper.

The swager feed motor 420 and the hopper feed and pusher mechanism are operated to swage the tip ends of tubes more rapidly than tubes are fed into the feed hopper. Whenever the supply of tubes in the swager feed hopper is reduced sufficiently by this faster swaging operation, the tubes will move at the upper end sufficiently to disengage the operating arm for the primary hopper feed control switch 372 to open the circuit to the timer 608 so the timer relay will time out and open the circuit through the timer contacts de-energizing the swager feed control relay 612. This will stop the motor and de-energize the brake solenoid 472 for immediately stopping rotation of the shaft 416 and the shaft 414. As soon as tubes delivered from the conveyor belt 326 into the feed hopper build up to an extent sufficient to again operate the operating arm for the primary hopper feed control switch 372 and hold it closed, the swager feed motor 420 will again be started through the operation of the operating arm for the secondary swager feed control switch 374.

When the tubes disengage the operating arm on the primary swager feed control switch 372 so that the circuit to the swager feed control relay 612 is open and the pusher bar 436 is in a position where it has been moved to the right to push a tube 2 into the swager for the swaging operation, the swager feed control switch 446 will be closed so that the swager feed and pusher mechanism will be continued in operation by the switch 446 continuing to hold the swager feed control relay 612 energized until the pusher bar 436 moves to the starting or return position. The swager feed control switch 446 insures the completion of a cycle of operation of the swager pusher mechanism to return the pusher bar 436 to the return position before the circuit to the swager feed control relay is opened to stop operation of the swager feed motor 420.

It will be understood that when the machine is started by moving the clutch lever 58 forwardly to engage the clutch that the tip feed mechanism will operate through the electric control circuits under the control of the switches 237 and 239 to feed a tip into position for insertion into a tube 2 when it reaches the operating position and after the slotting and punching mechanisms have operated to punch the several slots in a tube. The crimper head 288 is operated in the manner above described to crimp the end of the tube which receives the handle and as it finishes its crimping operation before moving to the return position, it operates the air control valve 314 for moving the piston in the compressed air cylinder 96 for moving the pusher member 98 and operating the knurling mechanism to knurl and feed one tube toward the operating position at the bottom of the lower hopper section. The electrical circuits will operate in the relation described above for feeding a tip for insertion into the end of each tube 2 while it is held in the operating position just before it is discharged onto the conveyor belt 326. The conveyor 326 delivers each tube successively to the swager feed hopper for automatically obtaining the swaging of the tip end of the tube about the tip with the circuit controls operating in the manner described hereinbefore.

The invention as herein described provides a machine for automatically feeding tubes from a hopper into a position where one end of the tube is knurled with subsequent feeding of the tubes one at a time into an operating position where the tubes are punched and slotted with the several openings and other formations, as shown in FIG. 1, and hereinbefore described. When this slotting and punching operation of each tube is completed it is then conveyed to the swager feed mechanism for being fed one at a time into the swager for forming the swaged conical end about the tip on the tube. This automatic machine provides an economical and efficient machine for automatically forming umbrella tubes to the extent necessary for the application of the ribs, the cover and the handle.

The invention provides an automatic method of first forming a dimple in one end of a tube and then knurling the opposite end of the tube with feeding of the tube into an operating position where it is provided with a plurality of slots, a stop projection and a mark and then conveyed to a swaging mechanism for swaging the tip in one end of the tube.

The invention provides a method and automatic machine for rapidly producing completed umbrella tubes at a reduced cost with the slots formed in the tube and the other parts of the tube formation produced with greater uniformity so the handles, ribs and runners can be assembled on the tubes to produce umbrellas in which the parts may be assembled with greater ease and the completed umbrellas have more uniformity than has heretofore been possible.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A machine for making umbrella tubes, comprising means for holding a piece of tubing in an operating position, means for forming a plurality of latch receiving slots in predetermined spaced relation in said piece of tubing, means for feeding a tip to engage the shank in one end of the tubing with the head engaging the extremity of the tubing, means for holding the tip in the tubing, and means for swaging the end of the tubing containing the tip to firmly engage the tubing about the shank of the tip to rigidly retain the tip in the tubing.

2. A machine for making umbrella tubes, comprising holding means for holding a tube, means for successively feeding tubes into said holding means, forming means for forming a plurality of slots in a tube while engaged in said holding means in predetermined spaced relation, tip feeding means for successively feeding umbrella tips one at a time to engage the shank of a tip in one end of a tube in said holding means, swaging means for subsequently swaging the end of said tube about said shank for rigidly retaining the tip in the end of said tube, and means of discharging tubes from said holding means and swaging means.

3. A machine for making umbrella tubes, comprising holding means operable for detachably receiving and holding a tube in a predetermined position therein, means for successively feeding tubes of predetermined size into said holding means, forming means for forming a plurality of slots in each tube in predetermined spaced relation while retained by said holding means, projection forming means for forming a projection on each tube in predetermined spaced relation to one of said slots on one end portion of said tube, tip inserting means for inserting a tip portion in the end of each tube while positioned in said holding means, swaging means for forming the end of each tube about the portion of a tip engaged therein for rigidly mounting the tip on the tube, and means for controlling feeding and discharging of tubes to and from said holding means and swaging means.

4. An umbrella tube making machine as claimed in claim 3, wherein knurling means is mounted on said machine in a position to successively knurl the terminal portion of each tube opposite to the portion receiving a tip as it is fed through said machine.

5. An umbrella tube making machine, as claimed in claim 4, wherein indexing means successively forms an index mark in a predetermined position on the knurled end of each tube while engaged in said holding means for indicating the position for mounting an umbrella handle on said tube.

6. An umbrella tube making machine, as claimed in claim 5, wherein crimping means engages the end of each tube while engaged in said holding means for forming the terminal portion into an inwardly extending flange portion.

7. An umbrella tube making machine, as claimed in claim 6, wherein said swaging machine tapers the end portion of said tube inwardly from a position inwardly of said tip to a smaller diameter about said tip to form a tapered end portion on each of said tubes.

8. An umbrella tube making machine comprising a base, a tube hopper mounted on said base for receiving a plurality of tubes, holding means for detachably clamping a tube in an operating position, feeding means on said hopper for successively feeding tubes one at a time from said tube hopper into said holding means, forming means mounted on said base operable to form a plurality of slots in each tube in a predetermined relation while clamped in said holding means, tip feeding means mounted on said base for successively feeding tips one at a time to engage a tip in one end of each tube while clamped in said operating position, swaging means mounted on said base in spaced relation to said holding and forming means, conveyor means for receiving said tubes from said holding means and delivering them to said swaging means, and means on said base for operating said holding means, feeding means, forming means, tip feeding means and swaging means in a predetermined timed relation to successively form slots in each tube and swage the end about said tip to rigidly hold the tip in assembled relation therein.

9. An umbrella tube making machine comprising a base, a tube hopper mounted on top of said base and formed to receive a plurality of tubes to be formed, said tube hopper having a guideway for discharging tubes therefrom in parallel relation one after another, feeding means operable to feed tubes in said hopper into said guideway one at a time, holding means mounted on said base for receiving tubes one at a time from the guideway in said tube hopper and detachably holding a tube in an operating position, forming means mounted on said base for forming a plurality of slots in a predetermined relation in each tube while it is clamped in said operating position in said holding means, tip feeding means for feeding a tip into engaged relation in one end of a tube while clamped in said operating position, operating means for operating said feeding means, holding means, forming means and tip feeding means in timed relation, swaging means for forming a tapered end on each tube about the portion of the tip engaged therein for rigidly holding the tip in said tube, and conveyor means for receiving tubes discharged from said holding means and conveying them to said swaging means.

10. An umbrella tube making machine as claimed in claim 9, wherein said tube hopper comprises a pair of spaced substantially parallel hopper plates extending upwardly from said base and detachably and adjustably mounted thereon, said hopper plates extending transversely of said base and having guideways formed therein opening through the inner faces in complementary relation for slidably receiving opposite ends of umbrella tubes of predetermined length for slidable movement therein in longitudinally extending relation, said guideways being formed in inclined relation with portions opening at the top portions of said plates for receiving a plurality of tubes therein for sliding movement downwardly for discharge from the lower portion of said hopper plates.

11. An umbrella tube making machine as claimed in claim 10, wherein said tube hopper has said guideways formed to provide an upper hopper section and a lower hopper section, latch means for normally retaining tubes in the upper hopper section, said feeding means being mounted on said hopper plates for operation to feed one tube at a time from said upper hopper section to disengage said latch means and move into said lower hopper section for discharge into said holding means.

12. An umbrella tube making machine, as claimed in clam 11, wherein said holding means comprises a pair of clamping dies detachably mounted on said base, at least one of said dies being movable toward and from the other, said clamping dies being mounted on said base between said hopper plates in position to receive a tube discharged from the guideways in said lower hopper section for support between and by one of said dies in open position, latch means for detachably retaining a tube on said one die, said operating means moving said movable die toward and from the other die for clamping a tube between said dies and disengaging the tube from said latch means in movement of said dies together to clamp a tube in operating position, and means for discharging said tube from between said dies as the dies are moved to open position to receive another tube, said latch means cooperating with said last mentioned means.

13. An umbrella tube making machine as claimed in claim 12, wherein said feeding means comprises a pair of pusher members slidably mounted one on each hopper plate at the lower ends of the guideways in said upper hopper section for reciprocating movement to engage a tube at opposite ends and push it past said latch means for movement into said lower hopper section toward said holding means, power operating means for reciprocating one of said pusher members, a shaft rotatably mounted at opposite ends on said hopper plates, and motion transmitting means connecting each pusher member with said shaft for operating both of said pusher members simultaneously to cooperate in discharging a tube from said upper hopper section into said lower hopper section.

14. An umbrella tube making machine as claimed in claim 13, wherein a pair of knurling dies are mounted on one of said hopper plates for engaging and knurling one end of an umbrella tube, at least one of said dies being movable toward and from the other, said knurling dies being located adjacent said feeding means for cooperation therewith in receiving a tube from said upper hopper section and knurling and feeding said tube into said lower hopper section.

15. An umbrella tube making machine as claimed in claim 14, wherein crimping means is mounted on said base adjacent the lower hopper section beyond the end opposite to the tip feeding means comprising a crimper bar movable longitudinally in alined relation with a tube clamped in said operating position, a crimping head mounted on the inner end of said crimper bar, and operating means for moving said crimper bar toward and from the end of an umbrella tube clamped in said operating position for engaging the inner end of said crimping head with the adjacent end of an umbrella tube clamped in said operating position for forming an inwardly extending end portion on the end of said umbrella tube in operating position.

16. An umbrella tube making machine as claimed in claim 15, wherein swager feed means comprises a swager hopper for receiving a supply of umbrella tubes conveyed thereto after discharge from said operating position, swager feed rollers for receiving and holding an umbrella tube in position for movement into said swaging means, a pusher bar mounted for reciprocating movement to engage and push an umbrella tube held by said swager feed rollers to engage the adjacent end of said tube in said swaging means for swaging said adjacent end, power operated means for reciprocating said pusher bar, and tube operated control means mounted on said swager hopper for controlling operation of said power operating means for reciprocating said pusher bar according to the tubes fed into said swager hopper.

17. A machine for making umbrella tubes comprising a base, a tube feed hopper mounted on said base having a pair of spaced hopper plates formed with complementary guideways opening inwardly toward each other, tube feed means controlling feeding of tubes through said hopper having a pair of tube pusher members mounted on said hopper plates with each of said pusher members adjacent one of said guideways, latch means mounted on said hopper plates in position to hold a supply of tubes in said tube feed hopper with a tube held in feeding position, said tube feed means being operable to feed one tube at a time past said latch means, a pair of clamping members operable to receive and clamp a tube received from said tube feed hopper in operating position, at least one of said clamping members being mounted on said base for reciprocating movement toward and from the other clamping member, slotting and punching members mounted on said base for reciprocating movement toward and from said operating position for forming slots and apertures in a tube in operating position having a predetermined spaced relation to each other, tip feeding means for feeding a tip into a position alined with the end of a tube clamped in said operating position, a tip pusher member mounted on said base for reciprocating movement to engage, push, and hold a tip positioned by said tip feed means into the adjacent end of a tube clamped in operating position, crimping means mounted on said base having a crimper bar mounted for reciprocating movement toward and from the opposite end of a tube in operating position for forming an inwardly extending end portion on said tube in said operating position while held by said tip pusher member, and swager means for subsequently swaging the end of said tube about said tip to rigidly retain said tip in said tube and close the tube about the end of the tip.

18. An umbrella tube making machine as claimed in claim 17, wherein power drive means mounted on said base operates said tube feed means, said movable clamping member, said slotting and punching members, said tip pusher member and crimper bar in timed relation to each other, conveyor means receives a tube from said operating position and conveys it toward said swager means, swager feed means for receiving tubes from said conveyor means and stacking a plurality of tubes in a swager feed hopper in position to be fed one at a time into said swager means, swager feed rollers mounted adjacent said swager feed hopper operable relative to each other for receiving one tube at a time from said swager feed hopper and positioning said tube in aligned relation with said swager means, a swager pusher bar mounted for reciprocating movement to push a tube held in said swager feed rollers into said swager for swaging one end of said tube on said tip, and swager feed operating means for operating said swager feed rollers and swager pusher bar in timed relation in receiving a tube from said swager hopper and moving one end into said swager means for swaging the end of said tube.

References Cited by the Examiner
UNITED STATES PATENTS

| | | | |
|---|---|---|---|
| 636,373 | 11/1899 | Wilms | 29—25 |
| 936,166 | 10/1909 | Riehl | 29—25 |
| 2,120,806 | 6/1938 | Keuffel | 29—516 |
| 2,972,186 | 2/1961 | Howe | 29—516 |

RICHARD H. EANES, JR., *Primary Examiner.*